(12) United States Patent
McKnight et al.

(10) Patent No.: US 9,057,522 B2
(45) Date of Patent: Jun. 16, 2015

(54) POWDERED FUELS, DISPERSIONS THEREOF, AND COMBUSTION DEVICES RELATED THERETO

(75) Inventors: James K. McKnight, Ithaca, NY (US);
James T. McKnight, Manlius, NY (US)

(73) Assignee: SUMMERHILL BIOMASS SYSTEMS, INC., Manlius, NY (US)

( * ) Notice: Subject to any disclaimer, the term of this patent is extended or adjusted under 35 U.S.C. 154(b) by 710 days.

(21) Appl. No.: 12/466,899

(22) Filed: May 15, 2009

(65) Prior Publication Data

US 2010/0055629 A1   Mar. 4, 2010

Related U.S. Application Data

(63) Continuation of application No. PCT/US2007/024044, filed on Nov. 16, 2007.

(60) Provisional application No. 60/859,779, filed on Nov. 17, 2006, provisional application No. 60/868,408, filed on Dec. 4, 2006, provisional application No. 60/993,221, filed on Sep. 10, 2007.

(51) Int. Cl.
| | |
|---|---|
| *F23N 1/02* | (2006.01) |
| *F23M 3/04* | (2006.01) |
| *F23D 1/00* | (2006.01) |
| *F23R 5/00* | (2006.01) |
| *C10L 5/36* | (2006.01) |

(Continued)

(52) U.S. Cl.
CPC ... *F23R 5/00* (2013.01); *F23D 1/00* (2013.01); *C10L 5/366* (2013.01); *C10L 5/44* (2013.01); *F02M 21/12* (2013.01); *F02M 29/02* (2013.01); *F03G 3/00* (2013.01); *F03G 7/00* (2013.01); *F23R 7/00* (2013.01); *Y02E 50/10* (2013.01); *Y02E 50/30* (2013.01); *Y02T 10/34* (2013.01); *Y02T 10/36* (2013.01)

(58) Field of Classification Search
USPC ............ 431/10, 12, 36, 175, 213; 137/6; 110/232, 345, 185, 186; 123/23
See application file for complete search history.

(56) References Cited

U.S. PATENT DOCUMENTS 1,355,444 A * 10/1920 Baxter ............... 110/104 R
1,475,502 A * 11/1923 Manning ................. 502/41

(Continued)

FOREIGN PATENT DOCUMENTS

DE        32 12 986      10/1983
DE    10 2004 019840     11/2005

(Continued)

OTHER PUBLICATIONS

International Search Report (PCT/ISA/210) for PCT/US2007/024044, May 29, 2008, Summerhill Biomass Systems.

(Continued)

*Primary Examiner* — Steven B McAllister
*Assistant Examiner* — Desmond C Peyton
(74) *Attorney, Agent, or Firm* — The Marbury Law Group, PLLC

(57) ABSTRACT

This application describes powdered fuels, methods of producing powdered fuels source, and dispersions of powdered fuels, as well as systems, kits, and methods for producing and adapting combustion devices to burn powdered fuel, either as a sole fuel source or in combination with existing fuel sources. Exemplary embodiments include engines and furnaces adapted to combust powdered fuel.

10 Claims, 25 Drawing Sheets

(51) Int. Cl.

| | |
|---|---|
| C10L 5/44 | (2006.01) |
| F02M 21/12 | (2006.01) |
| F02M 29/02 | (2006.01) |
| F03G 3/00 | (2006.01) |
| F03G 7/00 | (2006.01) |
| F23R 7/00 | (2006.01) |

(56) References Cited

U.S. PATENT DOCUMENTS

| | | | | |
|---|---|---|---|---|
| 1,926,304 | A * | 9/1933 | Pawlikowski | 44/504 |
| 1,939,018 | A * | 12/1933 | Odell | 568/475 |
| 2,918,362 | A * | 12/1959 | MacDougall et al. | 149/21 |
| 2,970,047 | A * | 1/1961 | Ciccone | 149/21 |
| 2,999,014 | A * | 9/1961 | Sagers et al. | 149/21 |
| 3,094,069 | A * | 6/1963 | Hradel et al. | 102/313 |
| 3,121,036 | A * | 2/1964 | Cook et al. | 149/21 |
| 3,122,429 | A * | 2/1964 | Toulmin, Jr. | 149/1 |
| 3,180,770 | A * | 4/1965 | Mills al. | 149/19.4 |
| 3,240,532 | A * | 3/1966 | Ahner, Jr. | 266/47 |
| 3,361,604 | A * | 1/1968 | Griffith | 149/44 |
| 3,520,743 | A * | 7/1970 | King | 149/19.4 |
| 3,730,093 | A * | 5/1973 | Cummings | 102/363 |
| 3,777,488 | A * | 12/1973 | Gross et al. | 60/204 |
| 4,368,678 | A * | 1/1983 | Ulveling | 110/347 |
| 4,522,154 | A * | 6/1985 | Taylor et al. | 122/4 D |
| 4,532,873 | A * | 8/1985 | Rivers et al. | 110/347 |
| 4,565,137 | A * | 1/1986 | Wright | 110/264 |
| 4,610,136 | A | 9/1986 | Abom | |
| 4,613,259 | A * | 9/1986 | Packer et al. | 406/14 |
| 4,655,147 | A * | 4/1987 | Brannstrom et al. | 110/263 |
| 4,693,764 | A * | 9/1987 | Curtis | 149/19.4 |
| 4,909,030 | A | 3/1990 | Ishihara | |
| 4,922,840 | A * | 5/1990 | Woodroffe et al. | 110/345 |
| 4,997,496 | A * | 3/1991 | Wehrli | 149/18 |
| 5,302,414 | A * | 4/1994 | Alkhimov et al. | 427/192 |
| 5,485,812 | A | 1/1996 | Firey | |
| 6,325,001 | B1 * | 12/2001 | Sheldon | 110/342 |
| 7,430,866 | B1 * | 10/2008 | Lynch et al. | 60/645 |
| 2004/0255831 | A1 * | 12/2004 | Rabovitser et al. | 110/345 |
| 2006/0115406 | A1 * | 6/2006 | Lai et al. | 423/412 |
| 2009/0214992 | A1 * | 8/2009 | McKnight et al. | 431/12 |
| 2009/0223467 | A1 * | 9/2009 | McKnight et al. | 123/23 |

FOREIGN PATENT DOCUMENTS

| | | |
|---|---|---|
| GB | 1 439 440 | 6/1976 |
| JP | 56-129720 A | 10/1981 |
| JP | 58 002450 | 1/1983 |
| JP | 58-221324 A | 12/1983 |
| JP | 63-223333 A | 9/1988 |
| JP | 8-338259 A | 12/1996 |
| JP | 2005-024221 | 1/2005 |
| JP | 2005-24221 A | 1/2005 |

OTHER PUBLICATIONS

Written Opinion (PCT/ISA/237) for PCT/US2007/024044, Mar. 20, 2009.
English Translation of Notification of Reason for Refusal issued in Japanese Patent Application No. 2009-537216, mailed Jul. 31, 2012.
Decision of Refusal issued in Japanese Application No. 2009-537216, mailed on Apr. 23, 2013.
Questioning (Shinjin) issued in Japanese Patent Application No. 2009-537216 mailed Jan. 28, 2014 with English-language translation.
Office Action received from the Canadian Intellectual Property Office in reference to Application No. 2,669,577 dated Dec. 31, 2013.
Sixth Office Action Issued by the Chinese State Intellectual Property Office for Application No. 200780049429.8 dated Feb. 3, 2015.
Notice of Preliminary Rejection from the Korean Intellectual Property Office in Application No. JP 10-2009-7012614 dated Sep. 5, 2014.
Notification of Reason for Refusal with English-Language Translation in Japanese Patent Application No. JP2009-537216 mailed Oct. 14, 2014.

\* cited by examiner

*Basic Block Diagram Explosible Powder Fuel Flow Control*

*Positive Displacement Powder Dispersion Fuel Flow Control Feedback Control Block Diagram*

POWDERED FUELS, DISPERSIONS THEREOF, AND COMBUSTION DEVICES RELATED THERETO

RELATED APPLICATIONS

This application is a continuation, pursuant to 35 U.S.C. §111 of PCT/US2007/024044, filed Nov. 16, 2007, designating the United States and published in English on May 29, 2008 as publication No. WO 2008/063549, which claims the benefit of priority of U.S. Provisional Patent Application No. 60/859,779, filed on Nov. 17, 2006; U.S. Provisional Patent Application No. 60/868,408, filed on Dec. 4, 2006; and U.S. Provisional Patent Application No. 60/993,221, filed on Sep. 10, 2007.

BACKGROUND OF THE INVENTION

Scientists and engineers have toiled for decades to discover workable alternatives to petroleum-based fuels. Despite this prolonged effort, such alternatives have failed to gain commercial success. However, this failure can hardly be attributed entirely to economic conditions. Indeed, market conditions have been favorable to petroleum alternatives, particularly in times of oil shortages such as during World War II and the 1970's energy crisis.

The lack of commercial success of alternative fuels may be explained, at least in part, to the shortcomings of prior systems. One of the major drawbacks of prior systems and methods of utilizing alternative fuels is the inability of the systems to provide the operational benefits of petroleum-based systems. For example, pellet-burning wood stoves and coal-fed cyclone furnaces lack the on/off functionality of gas and oil burners. The furnace will continue to burn the fuel added to the burner chamber until the fuel is consumed regardless of whether the desired temperature is reached. Likewise, existing pellet- and powder-based systems lack the ability to quickly respond to increased performance demands due to the "ramp up" time required to ignite the newly added fuel.

Moreover, the disadvantages of existing alternative fuel systems can be staggering. These systems often produce pollution that is worse than that produced by petroleum-based systems. For example, existing wood boilers produce unpleasant odors and large particulates that can irritate the lungs and eyes. See, e.g., Anahad O'Connor, *Wood Boilers Cut Heating Bills. The Rub? Secondhand Smoke*, N.Y. Times, Dec. 18, 2006. Additionally, these systems may not even produce the proper conditions for efficient combustion, for example, resulting in excess carbon monoxide production.

As the existing technology has been clearly inadequate to produce an alternative fuel system, there still remains a need for clean, dependable, and efficient alternate fuels, in addition to the systems that utilize these alternate fuels.

SUMMARY OF THE INVENTION

The present application provides methods, means, processes and systems that provide for energy conversion of an explosible powdered fuel source, as well as methods of producing the powdered fuel source. Particular aspects of the invention include methods of producing energy from a stationary deflagrating combustion wave, and systems/devices that utilize this energy, and this fuel source. Furthermore, the present invention provides methods for producing and adapting existing devices to burn this powdered fuel, either alone or in combination with existing fuel sources.

Moreover, although prior attempts have been made to harness powdered fuels for energy, such attempts have not utilized powdered fuels in conformance with the specifications and methods described herein and therefore, have failed to recognize the true potential of this energy source, and the clean, predictable, and efficient nature of such fuels.

Accordingly, one aspect of the present invention provides a method of producing energy. The method comprises the steps of mixing a substantially explosible powder with an oxidizing gas to form an explosible powder dispersion, directing the explosible powder dispersion in a controlled stream past an ignition source, and igniting the explosible powder dispersion to produce a stationary deflagrating combustion wave. As a result of the method, the explosible powder is substantially consumed to produce energy.

Another aspect of the invention provides a device operating using the energy derived by this method.

In an additional aspect, the invention provides a method of operating a combustion device. The method comprises mixing a substantially explosible powder with an oxidizing gas to form an explosible powder dispersion, directing the explosible powder dispersion in a controlled stream to an ignition source, and igniting the explosible powder dispersion to produce a stationary deflagrating combustion wave, thereby substantially consuming the explosible powder to produce energy and operate a combustion device using this energy.

In another aspect, the invention provides a method of operating a combustion device comprising; generating an airflow; dispersing a controlled quantity of powdered fuel into the airflow to create an explosible mixture; and introducing the explosible mixture to a combustion area for deflagration, thereby operating a combustion device.

Another aspect provides a method of operating a combustion device comprising: feeding an combustion device with a first fuel mixture comprising a ratio of a liquid fuel to a powdered fuel; and then decreasing the ratio of liquid fuel to powdered fuel progressively to produce a second fuel mixture, thereby operating the combustion device.

Yet another aspect provides a powdered fuel comprising a powder having a particle size distribution wherein: less than about 5% of the particles by weight have a size greater or equal to 200 mesh; and at least about 25% of the particles by weight have a size less than 325 mesh, wherein the particle size distribution is selected based on the use of the powder as an explosible fuel.

Another aspect provides a powdered fuel comprising powdered softwood particles having a particle size distribution wherein: less than 5% of the particles by weight have a size greater or equal to 50 mesh; less than 15% of the particles by weight have a size greater or equal to 80 mesh; and at least 20% of the particles by weight have a size less than 200 mesh.

Another aspect provides a powdered fuel comprising powdered hardwood particles having a particle size distribution wherein: less than 5% of the particles by weight have a size greater or equal to 80 mesh; and at least 30% of the particles by weight have a size less than 200 mesh.

Another aspect provides a powdered fuel comprising powdered grass particles having the particle size distribution wherein: less than 5% of the particles by weight have a size greater or equal to 200 mesh; at least 65% of the particles by weight have a size less than 325 mesh; and at least 25% of the particles by weight have a size less than 400 mesh.

Another aspect provides a powdered fuel dispersion comprising: a gas; and a powdered fuel wherein the powdered fuel is dispersed in the gas at a ratio one part powder to seven parts gas by mass.

Another aspect provides a kit for adapting a combustion device to deflagrate powdered fuel, the kit comprising: a turbulence chamber; a powder dispersing device; a compressed gas source; and a gas flow sensor.

Another aspect provides an engine comprising: a cylinder defined by a cylinder block having a bore; a cylinder head, coupled to the top of the cylinder block; and a piston received in the bore of the cylinder block; an intake valve in communication with the cylinder head; an intake manifold adjacent to the intake valve; a powder dispersing device; and a gas flow sensor.

Another aspect provides a furnace adapted to deflagrate powdered fuel, the furnace comprising: a nozzle; a turbulence chamber coupled with the nozzle; a powder dispersing device coupled with the turbulence chamber; and a compressed gas source coupled with the turbulence chamber.

Another aspect of the engine provides a dual-fuel engine comprising: a cylinder defined by a cylinder block having a bore; a cylinder head, coupled to the top of the cylinder block; and a piston received in the bore of the cylinder block; an intake valve in communication with the cylinder head; an intake manifold adjacent to the intake valve; a first fuel dispensing device for dispensing a first fuel; a second fuel dispensing device for dispensing a second fuel; and a gas flow sensor.

DETAILED DESCRIPTION OF THE INVENTION

I. Introduction

The challenges of the prior art demonstrate the need for systems capable of clean, dependable, and efficient combustion of powdered fuels.

As such, the inventions described herein provide for the use of dispersions of explosible powder mixed with an oxidizing gas to produce heat or perform work. In certain embodiments of the invention, the composition of the dispersion is selected to achieve explosibility for particular applications. In other embodiments, the dispersion is dispensed through a controlled mechanism to achieve and maintain a stoichiometric air/fuel ratio mixture that is in the explosible range. Through the inventions herein, the physics, thermodynamics, fluid mechanics, and chemistry of a stationary deflagrating combustion wave are exploited to create a stationary and sustainable flame front.

The inventions described herein provide a number of advantages. The powdered fuel dispersions combust in manner that is visually indistinguishable from gaseous and liquid fuels such as gasoline or propane. This characteristic allows for instant ignition and sustained burning without the need for a large initial heat input. Steady-state combustion is reached quickly. Like existing gaseous and liquid fuels, the flame produced by combustion of powdered fuel dispersions may be precisely controlled over a large range of heat outputs by adjusting the flow rate of the dispersion. The combustion of powdered fuel dispersion is almost completely soot free and odor free, as well as carbon neutral. Moreover, the powdered fuel dispersions provided are not limited to particular combustion applications, allowing the powdered fuel dispersions to be used with a variety of combustion devices and allowing a single combustion device to combust powdered fuel dispersions comprising a variety of fuels (e.g. hardwood, softwood, grass, metal, plastic) with little or no modification or adjustment required.

A further, important, and unexpected advantage is that this new form of combustible fluid is much safer than petroleum products such as oil, gasoline, propane, liquefied petroleum gas, and methane, i.e., this fuel when spilled or allowed to collect on a surface will not burn with a flame when touched with a blow torch. In contrast, spilled petroleum products pose a serious health and safety hazard.

Figure 1A:
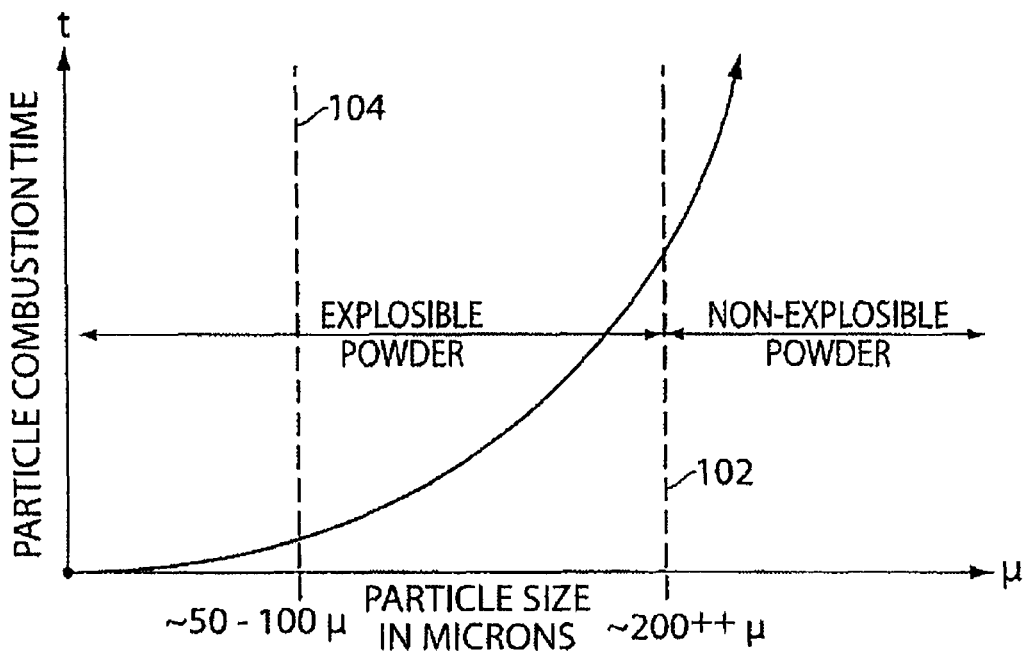
FIG. 1a depicts the relationship between particle combustion time and particle size.

The explosibility of powders is affected by, for example, several factors including the surface area of the powder particles, the energy content of the powder, the concentration of an oxidizer such as oxygen in the powder dispersion, the temperature of the powder and the oxidizer, the heat transfer rate, and the powder particle size. Generally, smaller particles combust faster than larger particles, resulting in the flame propagation which characterizes an explosible dispersion. FIG. 1a depicts the general relationship between particle size of a powder particle and the particle-combustion time. Dashed line 102 depicts the explosible limit for the powder—a threshold above which the dispersion is not explosible. This threshold varies from between individual dispersions and may vary due to the other noted factors above, even where the powder is the same between dispersions. For example, with respect to the concentration of an oxidizer, a first dispersion comprising a particular powder may not be explosible where the dispersion comprises air having 20.95% oxygen, while a second dispersion comprising the same powder may be explosible where the dispersion comprises pure oxygen. It should be understood that, in consideration of the disclosure of the present invention, methods and apparatus for determining the explosible limit of a powder are described in Wolfgang Bartknecht, *Dust Explosions: Course, Prevention, Protection* §2.3 (1989).

Figure 1B:
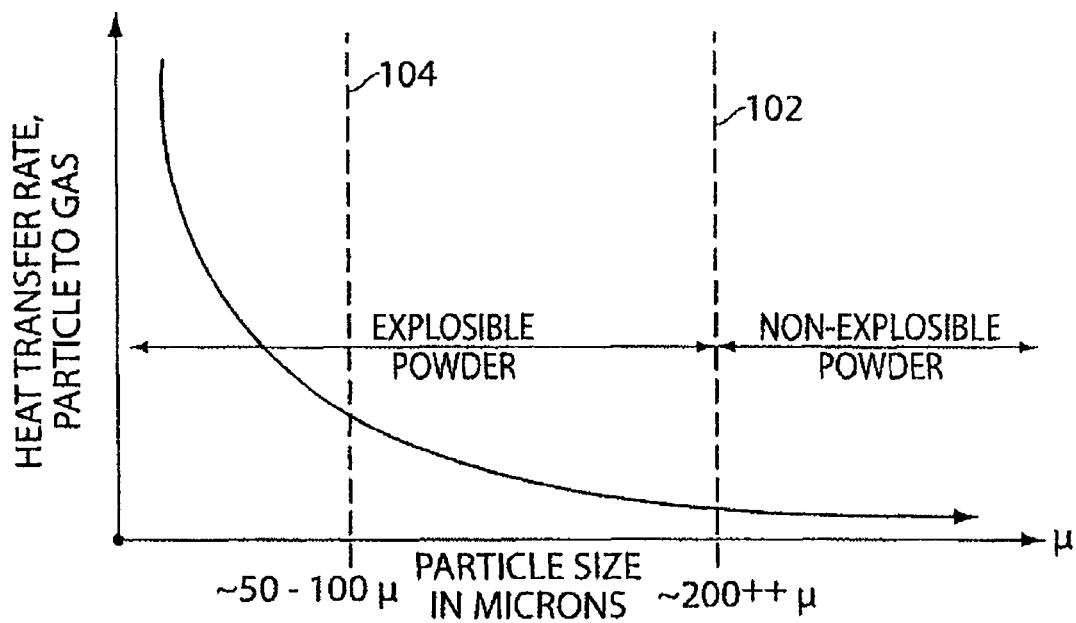
FIG. 1b depicts the relationship between heat transfer rate and particle size.

As depicted in FIG. 1b, there is a generally inverse relation between the heat transfer rate and the particle size. The heat transfer rate for smaller particles is generally higher than for larger particles. Again, dashed line 102 depicts the explosible limit. FIG. 1b provides explanation for the reasons why fuels composed primarily of large particles; for example, particles on the order of 500μ must remain in a furnace for a significant period of time.

Figure 1C:
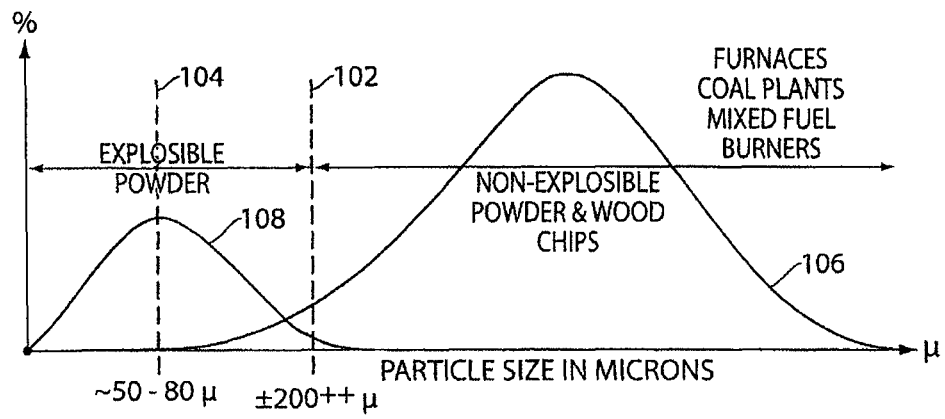
FIG. 1c depicts an exemplary particle size distribution for a powdered fuel provided herein and a particle size distribution for existing biomass fuels.

FIG. 1c generally depicts a difference between the powdered fuel dispersions provided herein and the powdered coal and biomass fuels used in existing combustion devices. As is seen, curve 106, which represents the particle size distribution of conventional fuels, is shifted to the right of curve 108, representing the particle size distribution of one embodiment of the powder fuels disclosed herein. Line 104 represents a median powder particle size for inventions described herein, which may, in some embodiments be between 50μ and 80μ.

Figure 1D:
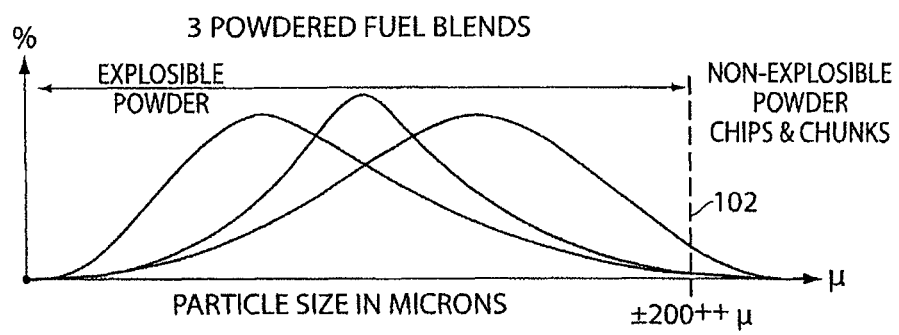
FIG. 1d depicts three exemplary particle size distributions for powdered fuels provided herein.

As depicted in FIG. 1d, the particle size distributions for embodiments of the inventions herein may have a variety of statistical characteristics.

By selecting a selecting powder dispersions wherein the powder size distribution has a median represented by line 104, dispersions are achieved that are explosible regardless of variables such as the surface area of the powder particles, the energy content of the powder, the concentration of an oxidizer such as oxygen, the temperature of the powder and the oxidizer, and the heat transfer rate, provided that sufficient oxidizing gas is present to qualify as explosible in nature. Accordingly, embodiments of inventions herein are capable of deflagrating dispersions of powdered fuel with little or no adjustment required for various powder materials.

Accordingly, in light of the present disclosure, it is now possible to use physics, thermodynamics, fluid mechanics, and chemistry to determine the approximate conditions to create the explosible powder dispersions of the invention.

However, before further description of the present invention, and in order that the invention may be more readily understood, certain terms have been first defined and collected here for convenience.

II. Definitions

The term "ash" as used herein describes the incombustible remains of combustion.

The term "biomass" as used herein describes any organic matter available on a renewable, or recurring, basis. Ashraf Elfasakhany, *Modeling of Pulverized Wood Flames* 3-4 (2005). Biomass may include a wide variety of substances including agricultural residues such as grasses, nut hulls, oat hulls, corn stover, sugar cane, and wheat straw; energy crops such as grasses including but not limited to pampas grass, willows, hybrid poplars, maple, sycamore, switch grass, and other prairie grasses; animal waste from animals such as fowl, bovine, and horses; sewage sludge; wood residues (hardwood and/or softwood) from industries such as logging, milling, woodworking, construction, and manufacturing; and food products such as sugars and corn starch. See, e.g., id. The chemical composition of selected types of biomass is described in Kirsten Hamilton, *Feasibility Study: Grain-dust Burner* (2006), available at http://www.esru.strath.ac.uk/Documents/MSc_2006/hamilton.pdf, the contents of which are incorporated by reference herein.

The language "blended powdered fuel" as used herein describes a powdered fuel that comprises two or more distinct powdered fuels, each of which may vary in particle size or material/composition.

The language "BTU content" as used herein describes the amount of energy (in British Thermal Units) produced when a fuel combusts.

The language "closed loop system" as used herein describes a system in which a result is monitored for deviations from a desired value and one or more inputs are adjusted to minimize the deviations.

The language "combustion device" as used herein includes any system that burns and/or deflagrates a fuel of any type. Such combustion devices include internal combustion engines, furnaces, grain dryers, and generators.

The term "converting" as used in the language "converting said energy" is used herein to describe the act of harnessing or utilizing, for example, said energy, to produce a result, such as doing work or producing heat. In certain embodiments, the conversion of the energy may occur through the operation of a device, as measured by the action of the device, i.e., which will produce a measurable result.

The terms "combustion" or "combust(s)" as used herein (without reference to a type of device, i.e., a combustion device), describe the act of deflagration. These terms are distinguishable from the act of simple burning.

The language "combustion area" as used herein describes a location where combustion occurs, for example, adjacent to a nozzle, inside an engine cylinder, etc.

The language "communicatively coupled" as used herein describes the ability of two more components to communicate by any technique and/or apparatus known to those of skill in the art.

The language "complete combustion," is art-recognized, and is used to describe a combustion reaction in which the oxidizer consumes the fuel, producing a limited number of products. As such, complete combustion of a hydrocarbon in oxygen, yields carbon dioxide and water. Complete combustion of a hydrocarbon or any fuel combusts in air, also yields nitrogen.

The term "controlled", as used in the language "controlled quantity," describes the characterization of a parameter that is capable of being modified, e.g., finely or coarsely, through the use of a feedback loop of information. For example, the language "controlled quantity" refers to the quantity of a measurement that is selected based on feedback modification, e.g., a feedback loop of information.

The language "controlled stream" is used herein to describe a movement or stream of particles that may be directly controlled and modified, e.g., by feedback modification, based on parameters flow rate, mass transfer rates, power/heat output, temperature regulation, and the like. The stream may be finely or coarsely controlled as the particular application may require. Moreover, devices, such as sensors described herein below, may be used to provide the data necessary to control or modify the stream. In particular embodiments, the stream may be controlled for the purpose of producing consistent explosible powder dispersion.

The term "coupled" is art-recognized, and is used herein to describe the connection of two or more components by any technique and/or apparatus known to those of skill in the art. Coupling may be direct (two components in physical contact with each other) or indirect (a first component in physical contact with one or more components that are in physical contact with a second component). For example, in the expression, "wherein the nozzle and the turbulence chamber are coupled by a first conduit," the term coupled describes the relationship between the nozzle and the turbulence chamber wherein a powder dispersion can flow from the turbulence chamber through the first conduit to the nozzle.

The term "deagglomeration" is used herein to describe the act of breaking up or removing large particles comprised of groups of smaller particles self-adhering in clumps.

The term "deflagrating," is art-recognized, and describes subsonic combustion that usually propagates through thermal conductivity (e.g., combusting material heats the next layer of cold material and ignites it). It should be understood that deflagration is distinguished from detonation in that detonation is supersonic and propagates through shock compression.

The term "directing" is used herein to describe the purposeful or deliberate guidance (e.g., through the use of devices or connections of components) of a material, such as the explosible powder dispersion of the invention, to a designated location. This may be distinguished from material that remains stationary, as in a dust explosion, which may be defined as deflagrating combustion wave front propagating through an initially stationary dust/air mix.

The term "explosible" as used herein describes a property of a powder, which, when dispersed under the appropriate conditions as a powder-gas mixture, is capable of deflagrating flame propagation after ignition. Explosible powders that form explosible powder dispersions are capable of flame propagation when mixed with the appropriate ratio of an oxidizing gas. Numerous explosible powders (which are distinguishable from ignitable powders) are described in Table A. I of Rolf K. Eckhoff, *Dust Explosions in the Process Industry* (3d ed. 2003), the contents of which are hereby incorporated by reference herein.

The term "gas" and "oxidizing gas" are used interchangeably herein to describe any substance in the gaseous state of matter, which contains a minimum amount of an oxidizing gas, e.g., $O_2$, to produce an explosible powder dispersion (i.e., even if insufficient to provide complete combustion). For example, the compressed gas from the compressed gas source, i.e., used to create explosible powder dispersions is an oxidizing gas, such as air. This term is intended to encompass gases of singular composition, e.g., $O_2$, and mixtures of gases, such as air. (This is in contrast to the use of this term as the abbreviated form of the word gasoline, liquefied petroleum gas, or natural gas.) In certain embodiments of the invention, a gas may be used to create a powdered fuel dispersion.

The language "incomplete combustion," is art-recognized, and is used to describe a combustion reaction in which the fuel is incompletely consumed by the combustion. Incomplete combustion will produce large amounts of byproducts. For example, incomplete combustion of hydrocarbons may produce carbon monoxide, pure carbon (soot or ash) and various other compounds such as nitrogen oxides. In a particularly advantageous embodiment of the invention, the level of incomplete combustion is reduced.

The term "mesh" as used herein to describe particle size by comparison to the open spacing of particle sieves as defined by a specific standard of mesh. A variety of standards for mesh scales exist including ISO 565, ISO 3310, and ASTM E 11-70. All mesh sizes referred to herein are measured using the ASTM E 11-70 standard.

The term "obtaining" as in obtaining a material, component or substance is intended to include buying, synthesizing or otherwise acquiring the material. In certain embodiments of the invention, the methods comprise an additional step of obtaining the explosible powder for use in the methods of the invention.

The language "particle size" as used herein describes the size of a particle, e.g., in terms of what size mesh screen the particle will pass through or by metric description of the size (e.g., in microns). Moreover, certain embodiments of the powdered fuel are defined, in part, by particle size. Particle size may be defined by mesh scales, in which larger numbers indicate smaller particles. As described herein, embodiments of powdered fuel may have a particle size smaller than or equal to 50 mesh. Powdered fuel also encompasses powdered fuels with more stringent requirements, for example, powdered fuels comprising particles smaller than approximately 60 mesh, e.g., smaller than approximately 70 mesh, e.g., 80 mesh, e.g., 90 mesh, e.g., 100 mesh, e.g., 110 mesh, e.g., 120 mesh, e.g., 130 mesh, e.g., 140 mesh, e.g., 150 mesh, e.g., 160 mesh, e.g., 170 mesh, e.g., 180 mesh, e.g., 190 mesh, e.g., 200 mesh, e.g. 210 mesh, e.g., 220 mesh, e.g., 230 mesh, e.g., 240 mesh, e.g., 250 mesh, e.g., 260 mesh, e.g., 270 mesh, e.g., 280 mesh, e.g., 290 mesh, e.g., 300 mesh, e.g., 310 mesh, e.g., 320 mesh, e.g., 325 mesh, e.g., 330 mesh, e.g., 340 mesh, e.g., 350 mesh, e.g., 360 mesh, e.g., 370 mesh, e.g., 380 mesh, e.g., 390 mesh, e.g., 400 mesh, e.g., 410 mesh, e.g., 420 mesh, e.g., 430 mesh, e.g. 440 mesh, e.g., 450 mesh.

The language "particle size distribution" as used herein describes the prevalence of particles of various size ranges, i.e., the distribution of the particles of various sizes, within a powder sample.

The term "plastic" as used herein describes synthetic or semisynthetic polymerization products including, but not limited to: polypropylene, polystyrene, acrylonitrile butadiene styrene (ABS), polyethylene terephthalate, polyester, polyamides, polyurethanes, polycarbonate, polyvinylidene chloride, polyethylene, polymethyl methacrylate, polytetrafluoroethylene (PTFE), polyetheretherketone (PEEK), polyetherimide, phenolics, urea-formaldehyde, melamine formaldehyde, and polylactic acid. As used herein, "plastic" includes the general categories of both recyclable and non-recyclable plastics.

The language "positive displacement" is used herein to describe a technique using devices that move a known volume of material per unit operation as in per stroke, per index, or even per unit time. In certain embodiments, positive displacement devices are useful for accurate metering of fluids and solids.

The term "powder," as used herein describes a solid compound composed of a number of fine particles that may flow freely when shaken or tilted. The powder composition and/or particulate size (and particulate size distribution) may be selected based on the application in which the powder is being used. For example, in certain embodiments the particle size distribution and/or particle material is purposefully selected based on the desired utility requiring a particular continuance, e.g., powdered fuel supplied to a four cycle engine may have a distribution of particles that is more fine than the powdered fuel supplied to a furnace. The powders of the present invention are at least "substantially explosible," in that the limited particles in the particle distribution that exceed the size limitations for explosibility amount to less than would prevent the powder dispersion from igniting to produce a sustainable stationary deflagrating combustion wave. In certain embodiments, the particles in the particle distribution that exceed the size limitations for explosibility are less than 20%, e.g., less than 15%, e.g., less than 14%, e.g., less than 13%, e.g., less than 12%, e.g., less than 11%, e.g., less than 10%, e.g., less than 9%, e.g., less than 8%, e.g., less than 7%, e.g., less than 6%, e.g., less than 5%, e.g., less than 4%, e.g., less than 3%, e.g., less than 2%, e.g., less than 1.5%, e.g., less than 1.0%, e.g., less than 0.75%, e.g., less than 0.5%, e.g., less than 0.25%. In a particular embodiment, the particles in the particle distribution that exceed the size limitations for explosibility are less than 2%. In another particular embodiment, there are no particles in the particle distribution that exceed the size limitations for explosibility.

The term "powdered" as used herein described a substance that has been reduced to a powder.

The language "powdered fuel dispersion" and "powder dispersion" are used interchangeably herein to describe substantially uniform mixtures of powdered fuel and an oxidizing gas, which are selected to be explosible based on the nature of the powder (e.g., size and/or composition of the constituent particles) and the ratio of the powder to the oxidizing gas. The explosibility of the powdered fuel dispersion may be affected by a number of factors including, for example, the surface area of the powder particles, the energy content of the powder, the concentration of an oxidizer such as oxygen in the powder dispersion, the temperature of the powder and the oxidizer, the heat transfer rate, and the powder particle size. The language "powdered fuel dispersion" and "powder dispersion" is also intended to cover those dispersions that comprise an imperfectly distributed mixture made with an imperfect distribution of an explosible powder, provided that such dispersions are explosible.

The language "stoichiometric" for example, as used in relation to the language "stoichiometric combustion," or "stoichiometric mixture, are used herein to describe the ratio of the explosible powdered fuel to the oxidizing gas in the powdered fuel/oxidizing gas mixture, i.e., the powdered fuel dispersion of the invention, that is suitable to support deflagration and substantially consume the explosible powder in the mixture or dispersion. The stoichiometric amount of oxidizing gas necessary to consume the explosible powder in the combustion area may be distinguished from the amount of oxidizing gas of the powder dispersion, which is sufficient to create an explosible mixture yet is typically lower that the total amount of oxidizing gas that is ultimate capable of consuming the powder. As such, powders of the present invention are explosible even without a stoichiometric amount of an oxidizer.

The language "substantially consuming" is used herein to describe level of consumption of the explosible powders of the invention. A powder of the invention that is substantially consumed produces less than 5% by weight residue, e.g., less than 4% by weight, e.g., less than 3% by weight, e.g., less than 2.5% by weight, e.g., less than 2% by weight, e.g., less than 1.5% by weight, e.g., less than 1.25% by weight, e.g., less than 1% by weight, e.g., less than 0.75% by weight, e.g., less than 0.5% by weight, e.g., less than 0.25% by weight. In certain embodiments, substantially consuming is complete consumption. In certain embodiments, the present invention is directed to reducing the amount of incomplete combustion, or production of the consumption residue noted above.

The language "turbulent combustion" is art-recognized, and used to describe a combustion characterized by turbulent flows. In certain embodiments of the invention the deflagrating combustion is turbulent combustion, which assists in the mixing process between the fuel and oxidizer.

The language "ultra clean coal" as used herein describes any coal having a low ash content by weight, for example, less than 1.00%, e.g., less than 0.95%, e.g. less than 0.90%, e.g., less than 0.85%, e.g., less than 0.80%, e.g., less than 0.75%, e.g., less than 0.70%, e.g., less than 0.65%, e.g., less than 0.6%, e.g., less than 0.55%, e.g., less than 0.50%, e.g., less than 0.45%, e.g., less than 0.40%, e.g., less than 0.35%, e.g., less than 0.30%, e.g., less than 0.25%, e.g., less than 0.20%, e.g., less than 0.15%, e.g., less than 0.10%, e.g., less than 0.05%.

The language "volatile mass" as used herein describes the mass of the powder fuel particles that comprises material or compounds, such as water, which vaporize or volatilize at or below the combustion temperature of the powdered fuel.

III. Methods of Utilizing Powdered Fuel

In one embodiment, the invention provides a method of producing energy comprising the steps of mixing a substantially explosible powder with an oxidizing gas to form an explosible powder dispersion, directing the explosible powder dispersion in a controlled stream past an ignition source, and igniting the explosible powder dispersion to produce a stationary deflagrating combustion wave. The method thereby substantially consumes the explosible powder to produce energy, e.g., heat energy or energy used to perform work. In certain embodiments, the explosible powder dispersion in the controlled stream may be defined by one or more selected from the group consisting of: powder fuel energy content, powder fuel size, oxidizing gas characteristics, and oxidizing gas temperature. Moreover, the explosible powder may comprise a material selected from the group consisting of powdered biomass (e.g., powdered hardwood, powdered softwood, powdered grass) powdered metals, powdered plastics, and any combination thereof. In certain embodiments the method further comprises the step of obtaining the explosible powder.

This method may further comprise the step of converting the energy produced by/through/in the operation of a device. Such device may be selected from the group consisting of furnaces, engines, boilers, grain driers, clothes driers, water heaters, combined furnace/water heaters, hot air balloons, space heaters, wood burning stoves, gas fireplaces, gas turbines, and electrical generators.

An additional embodiment of the invention, therefore, provides a device operating using the energy derived by this method. In certain embodiments, the device has been adapted from the primary design of the device to operate using the energy. In other embodiments, the device has a primary design to operate using the energy.

In another embodiment, the invention provides a method of operating a combustion device comprising mixing a substantially explosible powder with an oxidizing gas to form an explosible powder dispersion, directing the explosible powder dispersion in a controlled stream to an ignition source, and igniting the explosible powder dispersion to produce a stationary deflagrating combustion wave, thereby substantially consuming the explosible powder to produce energy and operate a combustion device using this energy.

Figure 2:
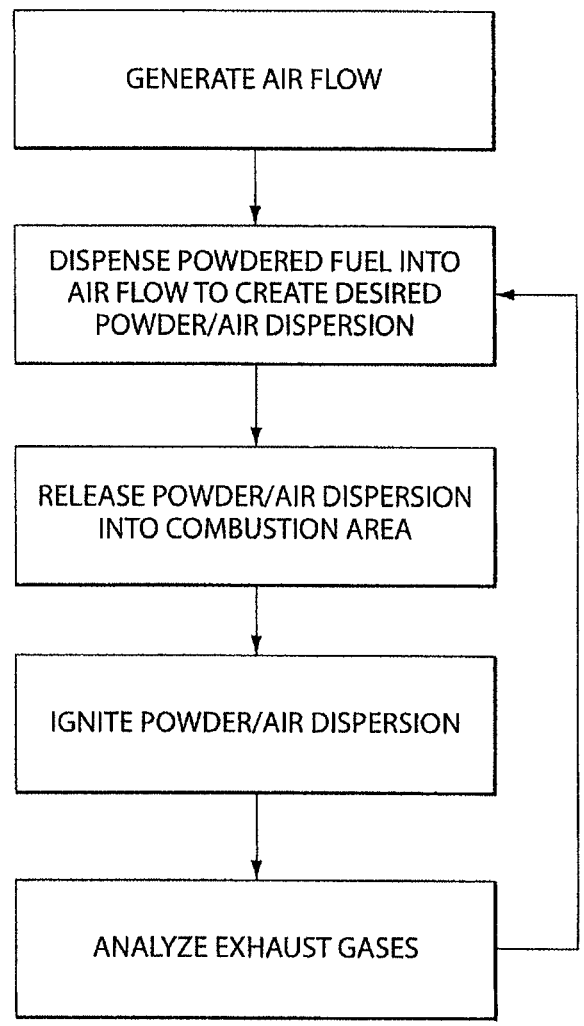
FIG. 2 is a block diagram depicting a method of operating a combustion device utilizing powdered fuel.

FIG. 2 depicts a method 200 of utilizing a powdered fuel. In step 202, a gas flow is generated. In step 204, a controlled quantity of powdered fuel is dispensed into the gas flow to create a desired fuel/gas dispersion. In some embodiments, the controlled quantity of powdered fuel is dispensed from a positive displacement powder dispenser. Positive displacement powder dispensers, which are described herein, allow for a highly controllable release of powder. In some embodiments, the powder dispersing rate of the positive displacement powder dispenser may be linear or quasi-linear with respect to a voltage that drives the positive displacement powder dispenser.

In step 206, the powder/air dispersion is released into a combustion area. The powder/air dispersion may be transported from the location where the dispersion is formed by air pressure from the gas flow. The powder/air dispersion may flow through one or more components such as conduits, nozzles, manifolds, and valves to reach the combustion area.

In step 208, the powder/air dispersion is ignited. The powder/air dispersion may be ignited by a variety of techniques and apparatuses known to those of skill in the art, including a pilot light or flame such as a pilot light consuming methane or propane, and electrical spark or arc, for example, from a spark plug.

In some embodiments of the invention, exhaust gases are analyzed as shown in step 210. Exhaust gases may be analyzed to detect the presence and or quantities of a variety of substances. In some embodiments, the oxygen level of the exhaust gases is analyzed to determine if the fuel/gas dispersion is stoichiometric. If sufficient oxygen is not present in the exhaust gases, the fuel/gas dispersion is too rich and the quantity of powder fuel to be dispensed will be reduced. If too much oxygen is present, the dispersion is too lean and additional powder fuel will be dispensed. Additionally or alternatively, exhaust gases may be analyzed for the presence of carbon monoxide, which indicates that the fuel/gas mixture is too rich.

The present invention also provides a method of operating a combustion device comprising feeding an operating engine with a first fuel mixture comprising a ratio of a liquid fuel to a powdered fuel; and then decreasing the ratio of liquid fuel to powdered fuel progressively to produce a second fuel mixture, thereby operating the combustion device. In certain embodiments, the first fuel mixture comprises only liquid fuel. In certain embodiments, the second fuel mixture comprises only powdered fuel. The ratio may be adjusted as a function of at least one input selected from the group consisting of: engine temperature sensors, engine speed sensors, throttle sensors, intake temperature sensors, exhaust temperature sensors, intake gas sensors, and exhaust gas sensors.

In another embodiment, the invention provides a method of operating a combustion device comprising generating an airflow; dispersing a controlled quantity of powdered fuel into the airflow to create a explosible mixture; and introducing the explosible mixture to a combustion area for deflagration, thereby operating a combustion device. In certain embodiments, the airflow is in a turbulence chamber. The method may further comprise measuring the airflow; and adjusting the controlled quantity of powdered fuel to be dispersed as a function of the airflow, e.g., wherein adjusting the controlled quantity of powdered fuel to be dispersed comprises adjusting the speed of a powder dispersing device. Additionally, the method may further comprise measuring a secondary airflow; and adjusting the controlled quantity of powdered fuel to be dispersed as a function of the secondary airflow, e.g., wherein adjusting the controlled quantity of powdered fuel to be dispersed comprises adjusting the speed of a powder dispersing device.

The above embodiments facilitate starting an engine using a liquid or gaseous fuel and transitioning to combustion, in whole or in part, of powdered fuel. Such a method may be particularly useful for "cold starts" of a combustion device. In some embodiments the liquid or gaseous fuel may be selected from gasoline, hydrogen, vegetable oil, biodiesel, bioalcohol, butanol, bioethanol, biomethanol, biogas, 2,5-dimethylfuran (DMF), dimethyl ether (DME), Bio-DME, Fischer-Tropsch diesel, wood diesel, ethane, methane, propane, butane, diesel fuel, fuel oils, jet fuel, kerosene, liquefied petroleum gas, and natural gas. Additionally or alternatively, the liquid or gaseous fuel may comprise a starting fluid such as dimethyl ether.

IV. Kit for Deflagration of Powdered Fuels

In another embodiment, the invention further provides a combination of mechanical elements useful to adapt a device to operate using the energy derived by the methods described herein above, i.e., the energy produced by directing a controlled stream to an ignition source to produce a stationary deflagrating combustion wave. For example, the invention described herein provides a kit for adapting a combustion device to deflagrate powdered fuels. Accordingly, one embodiment of the invention provides a kit for adapting a combustion device to deflagrate powdered fuel, the kit comprising a turbulence chamber; a powder dispersing device; a compressed gas source, e.g., wherein the compressed gas source is adapted for connection with the turbulence chamber; and an optional gas flow sensor, e.g., a mass flow sensor. The inclusion of the optional gas flow sensor will be based on the combustion device being adapted. In certain embodiments, the kit further comprises a nozzle, which, in certain embodiments, may be adapted for connection with the turbulence chamber.

In certain embodiments, the gas flow sensor is selected from the group consisting of a vein meter mass flow sensor, a hot wire mass flow sensor, a cold wire mass flow sensor, and a membrane mass flow sensor. In particular embodiments, the gas flow sensor is adapted for connection with the fuel controller. In additional particular embodiments, the gas flow sensor is adapted for communicative coupling with the powder dispersing device. Moreover, the speed of the powder dispersing device may be governed by the gas flow sensor. Mass flow sensors are available from Sensata Technologies of Attleboro, Mass.; Robert Bosch GmbH of Gerlingen, Germany; DENSO Corporation of Aichi, Japan; Visteon of Van Buren Township, Mich.; Delphi Corporation of Troy, Mich.; Hitachi, Ltd. of Tokyo, Japan; and Kolbenschmidt Pierburg AG of Neckarsulm, Germany.

With respect to the powder dispersing device, a number of embodiments may be considered within the scope of the present invention. For example, the powder dispersing device may be a positive displacement powder dispersing device. Additionally, the powder dispersing device may comprise a hopper, e.g., wherein the hopper is tapered. The powder dispersing device may further comprise a vibrator in contact with the hopper. In some embodiments, the vibrator may be an ultrasonic (ultrasound) vibrator. The powder dispersing device may also further comprise an auger positioned within the hopper, and a power source connected to the auger to rotate the auger. In addition, the powder dispersing device may also comprise a horizontal auger positioned below the hopper, an air lock, a mixer located within the hopper, a conduit, wherein the turbulence chamber and the nozzle are connected by the conduit, and/or be adapted for connection with the turbulence chamber.

In an additional embodiment, the powder dispersing device may further comprise a second conduit for connection with the powder dispersing device, and a second powder dispersing device for connection with the conduit. Moreover, in certain embodiments, the second powder dispersing device may comprise a second hopper, e.g., wherein the second hopper is tapered. In another embodiment, the second powder dispersing device may comprise a second auger positioned within the second hopper; and a second motor connected to the auger to rotate the second auger. In a particular embodiment, the second powder dispersing device may further comprise a second vibrator in contact with the second hopper. The second hopper may also comprise an air lock.

An exemplary embodiment of the invention provides a kit further comprising one or more sensors selected from the group consisting of engine temperature sensors, engine speed sensors, throttle sensors, intake temperature sensors, exhaust temperature sensors, intake gas sensors, and exhaust gas sensors; and a fuel controller communicatively coupled with the one or more sensors and adapted to adjust the quantity of the powdered fuel released from the powder dispersing device. In certain embodiments, the fuel controller adjusts the quantity of the powdered fuel released from the powder dispersing device to maintain excess oxygen in exhaust gases.

The kits of the invention may be used to adapt any powered device capable of operating under the power of powdered fuel, e.g., a powdered fuel described herein. In fact, in certain embodiments, the kit may be adapted for use of a powdered fuel described herein. Particular embodiments, which are not intended to be limiting of the invention, include a furnace, an engine, a boiler, a grain drier, a clothes drier, a water heater, a combined furnace and water heater, a hot air balloon, a space heater, a wood burning stove, and a gas fireplace. Such embodiments may be achieved by replacing and/or supplementing an existing system for combusting fuels. For example, in a grain drier such as those available from Farm Fans, Incorporated of Assumption, Ill., a powdered fuel burner could replace and/or supplement conventional burners that require propane or natural gas. Similarly, in a clothes dryer or a space heater, a powder fuel burner could supplement or enhance conventional electric or natural gas heating elements. A wood burning stove could be retrofitted to utilize the powdered fuel technology described herein by mounting a powdered fuel burner within a combustion area of the wood stove. In a fireplace embodiment, the powdered fuel burner could supplement or replace the flames produced through a liquid or gaseous fuel such as natural gas.

Accordingly, the kits may comprise instructions for assembling the kit in order to adapt the existing to device to operate on a powdered fuel. In a specific embodiment, the kit may further comprise instructions for installing the kit in a furnace. In another specific embodiment, the kit may further comprise instructions for installing the kit in an engine.

Figure 3A:
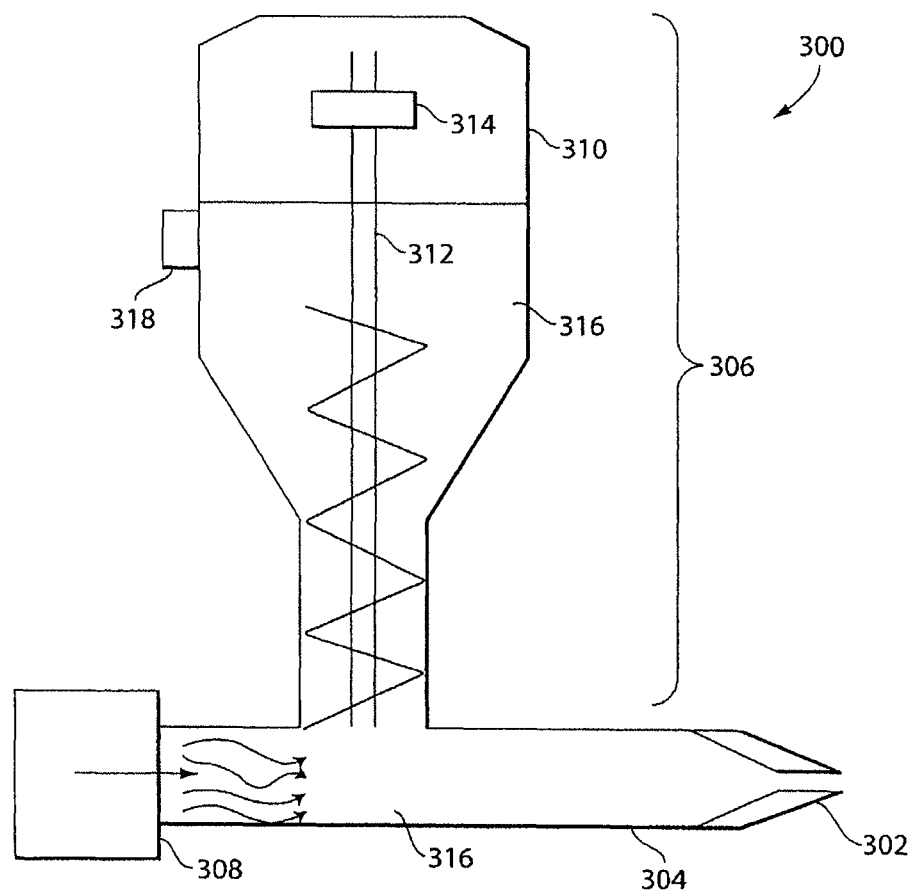
FIGS. 3a, 3b, 4, 4a, 5, 5a, 6, and 7 depict embodiments of kits and systems for creating powdered fuel dispersions.
Figure 3B:
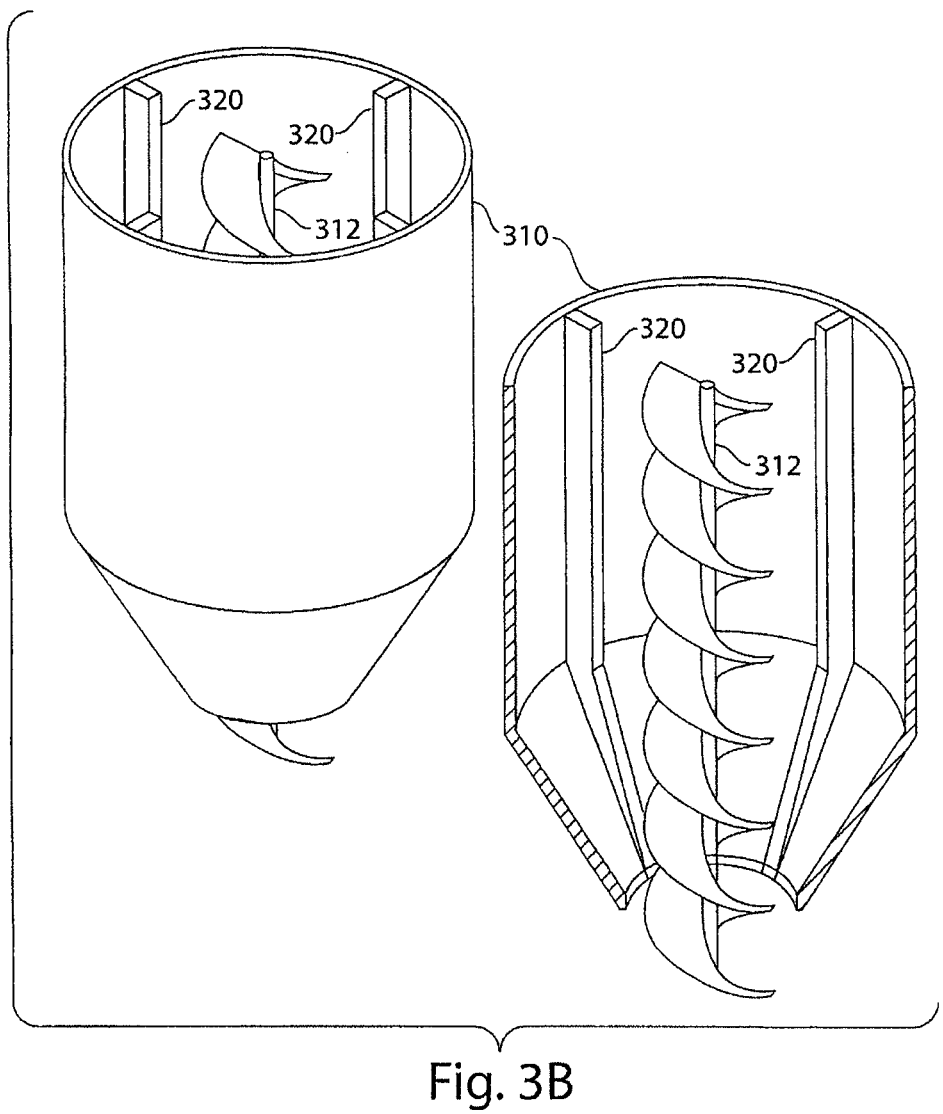
Figure 4:
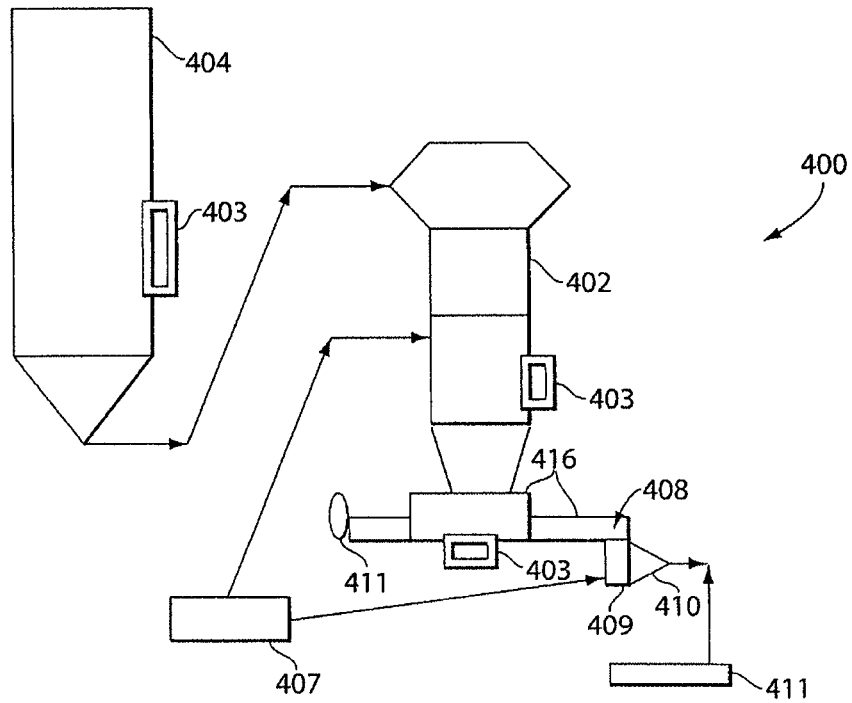
Figure 4A:
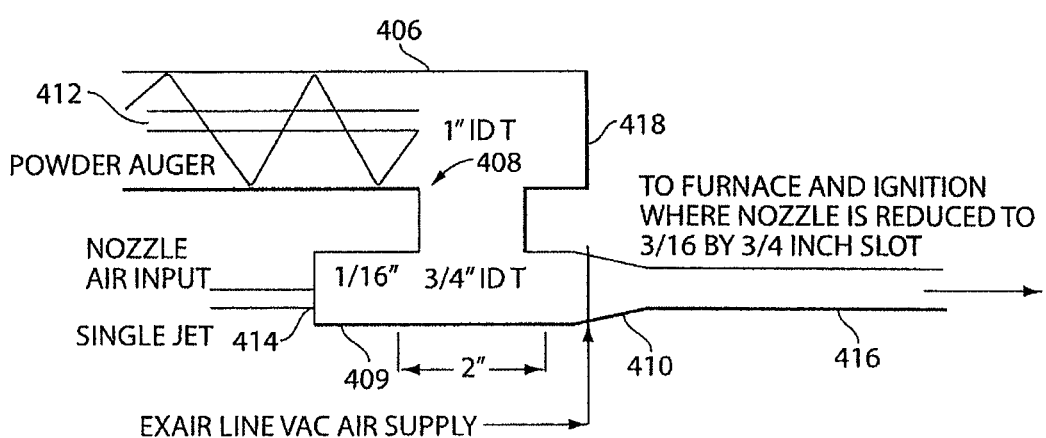

The invention may be further clarified by utilization of an exemplary embodiment and modifications thereto, the modification of which should be understood as applicable to kits in general. FIG. 3 depicts such a kit, Kit 300.

A. Exemplification and Modifications Thereof

Kit 300 includes a nozzle 302. Nozzle 302 is designed for connection to turbulence chamber 304. The turbulence chamber 304 is designed for connection with a powder dispersing device 306. The turbulence chamber 304 is designed for connection with a gas source 308. The components 302, 304, 306, 308 of kit 300 may be produced and sold as individual, disassembled components, or one or more of the components may be combined, in manufacturing and/or after manufacturing.

Nozzle 302 may be adapted for coupling, mounting, and/or placement in a variety of locations. In an application of the inventions related to internal combustion engines, nozzle 302 may be coupled with an intake manifold, throttle body, or inside the combustion chamber in a manner similar to conventional gasoline or diesel injectors. In applications of the inventions to furnaces, the nozzle 302 may be located in a burner chamber. Similarly, with respect to kits for adapting a device such as a torch or a flame thrower, nozzle 302 may be located externally to the device and in close proximity to the flame during operation. Once the powdered fuel mixture leaves the nozzle 302 and any extensions thereto, the powdered fuel mixture is ignited and combusts in the presence of secondary oxygen as in combustion devices for liquid fuels such as propane or methane. By utilizing secondary oxygen for combustion, the nozzle velocity may be reduced allowing for the production of a sustainable flame.

Accordingly, the nozzle 302 may be composed of a variety of materials to reflect the environment in which the nozzle 302 will be placed (e.g. high temperature, high vibration environments). Exemplary materials include, but are not limited to, iron, steel, stainless steel, tungsten steel, copper, brass, aluminum, gold, silver, titanium, alloys thereof, and polymers.

In some embodiments of nozzle 302, the nozzle may contain a single orifice for ejecting the fuel mixture. Additional orifices for ejecting combustion gases are not required, but may be included to achieve particular flow rates and/or fuel dispersion patterns. Sufficient gas for combustion will generally be supplied in the fuel mixture and the combustion environment, such as a burner chamber or an engine cylinder. For furnace applications, it may be desirable for economic and noise reduction motives to configure the system wherein the fuel/gas dispersion passes through the nozzle at as low a pressure and flow rate as is practicable.

Nozzle velocity may be controlled through nozzle 302 selection and/or adjustment of the gas source. Various applications may require different nozzle velocities. Lower velocities may be desired for automotive applications, while higher velocities may be better suited for furnaces and still larger velocities may have some commercial and industrial applicability. Lower velocities allow the flame to spread laterally from the direction of the fuel mixture, which may be desired in furnace applications. Generally, as the nozzle velocity increases, the flame length increases and the distance between the ignition point and the nozzle 302 may need to be increased. For example, when using a three-port nozzle providing an approximately 200 mph nozzle velocity, the ignition point may be four feet or more from the nozzle.

Adjusting the nozzle velocity to reflect the properties of the fuel mixture may create a sustainable flame. Generally, a sustaining flame (i.e. a flame that does not require a continuous ignition source) may be achieved where the nozzle velocity is lower than the deflagrating wave front velocity.

In some embodiments, the nozzle 302 may be, or may be similar to conventional fuel injectors for gasoline or diesel fuels. Nozzle 302 may also be a nozzle designed for powder spraying, for example, nozzles produced by Nordson Corporation of Westlake, Ohio; EXAIR of Cincinnati, Ohio; and Powder Parts, Inc. of Elgin, Ill.

In some embodiments, a nozzle extender or extension tubing may be coupled to the nozzle 302 to allow for positioning of the nozzle 302 away from the desired location for powder dispersal. Suitable tubing includes ½" CTS Genova CPVC 4120, available from Genova Products, Inc. of Davison, Mich., and other tubing available from Nordson Corporation of Westlake, Ohio and EXAIR of Cincinnati, Ohio.

Turbulence chamber 304 may be composed of any material capable of withstanding turbulent pressure flows used to form a powder-gas mixture or dispersion. Examples include, but are not limited to pipes and tubing comprised of iron, steel, stainless steel, tungsten steel, copper, brass, aluminum, gold, silver, titanium, alloys thereof, plastics, and polymers. In some embodiments, the turbulence chamber 304 may be electrically charged to minimize attraction between the powdered fuel and the turbulence chamber 304.

In some embodiments, the turbulence chamber 304 may connected to the nozzle 302 by a conduit (not shown). The conduit may include any material suitable for channeling the powder-gas dispersion to the nozzle 302, such as pipes and tubing comprised of iron, steel, stainless steel, tungsten steel, copper, brass, aluminum, gold, silver, titanium, alloys thereof, plastics, and polymers. The size of the conduit will vary to reflect the particular application of the kit. Exemplary internal diameters for the tubing are ¼", ⅜", ½", ⅝", ¾", ⅞", 1", 1¼", 1½", 1¾", and 2". Exemplary tubing includes tubing available from Nordson Corporation of Westlake, Ohio and EXAIR of Cincinnati, Ohio. In some embodiments, the conduit may be electrically charged to minimize attraction between the powdered fuel and the conduit.

Powder dispersing device 306 may be any device capable of distributing a controlled amount of powdered fuel. One embodiment of the powder dispersing device 306 is depicted in FIG. 1. Powder dispersing device 306 includes a hopper 310, an auger 312, and a motor 314 for rotating the auger. Hopper 306 may be any vessel capable of holding the powdered fuel. Exemplary hoppers are described in Franklin D. Jones, *Ingenious Mechanisms For Designers and Inventors* 483-94 (1930). While the motor 314 is depicted within the hopper 310, motor 314 may be located either internally or externally and may be connected directly with auger 312 directly or though any linkage known to those of skill in the art. The auger 312 may also be driven by the engine in an automobile. The auger 312 may be of any length, but generally will be less than 12" in length. Sample auger systems are described in U.S. Pat. No. 4,895,274 to Morimoto et al., U.S. Pat. No. 6,951,230 to Wegman, and U.S. Patent Application Pub. No. 2003/0090957 of Kressin et al., the contents of which are incorporated by reference herein. Sample powder dispersing devices are available from ALLFILL Inc. of Exton, Pa. and Carolina Conveying, Inc. of Canton, N.C.

To enhance movement of the powder 316 and reduce the occurrence of agglomerates in the hopper 310, one or more vibrators 318 may be located in contact with or in proximity to the hopper 310, the powder 316, and or both. Vibrators are well known in the art and are described in U.S. Pat. No. 7,271,516 to Matsubara et al., U.S. Patent Application Pub. No. 2007/0145840 of Ki, and U.S. Patent Application Pub. No. 2007/0159016 of Olivier, the contents of which are incorporated by reference herein.

Compressed gas source 308 may be any device for producing compressed gas, as is known in the art. Compressed gas source 308 may be powered mechanically or electrically. For example, in heating application such as home furnaces, compressed gas may be provided by a 150 psi high volume gas compressor such as a Central Pneumatic 12 volt, 150 psi, high volume gas compressor available from Harbor Freight Tools of Camarillo, Calif. (catalog #93186-ovga). Larger gas flow rates may be desired for automotive or industrial applications and may be provided, for example, by a Central Pneumatic 115 psi, 2 gallon gas compressor, available from Harbor Freight Tools of Camarillo, Calif. (catalog #94724-ovga) or a compressor capable of delivering 3.4 cfm at 40 psi.

In other embodiments, the compressed gas source 308 may be a compressed gas tank. Compressed gas tanks are well known in the art and are described in various publications from organizations such as the Compressed Gas Association of Chantilly, Va. One or more compressed gas tanks may provide a gas or mixture of gases to the turbulence chamber 304.

The gases provided to the turbulence chamber 304 may be any of a variety of gases including air. In certain embodiments, the gas may be an oxidizer such as oxygen, ozone, fluorine, chlorine, or bromine. In particular embodiments, the gas is air or another oxygen source, e.g., $O_2$ gas.

In some embodiments, the kit includes a fuel controller to regulate the volume of fuel released into the turbulence chamber 304. The fuel controller may be any hardware, software, or mechanical component as is known to those of skill in the art, such as computers, microprocessors, and RISC microprocessors. Exemplary systems and components are described in a number of texts including Ross Bannatyne, *Electronic Control Systems* (2003), Ali Emadi, ed., *Handbook of Automotive Power Electronics and Motor Drives* (2005), Ronald K. Jurgen, *Automotive Microcontrollers* (1998), and Ronald K. Jurgen, *Automotive Software* (2006).

The fuel controller may be connected to one or more sensors. For automotive embodiments, sensor may include engine temperature sensors, engine speed sensors (tachometers), throttle sensors, intake temperature sensors, exhaust temperature sensors, intake gas sensors, and exhaust gas sensors. Automotive sensors are well know in the art and are available from a variety of vendors including Delphi Corporation of Troy, Mich.

In certain furnace embodiments, sensors may include flame temperature sensors, compressed gas temperature sensors, sensors that measure temperatures from a thermostat, sensors that measure temperatures from within the furnace (e.g. water temperatures in a boiler or heat exchanger temperatures), oxygen sensors, intake gas sensors, and exhaust gas sensors. Temperature sensors may include a variety of devices known to those of skill in the art including thermocouples.

The fuel controller may also receive additional input indicating data about the fuel(s) used in the combustion device. For example, data on powdered fuels may include the type of fuel (e.g. hardwood, softwood, metal, coal) and specification of the fuels (e.g. particle size, ash percentage, volatile mass percentage). Data on liquid fuels may include the type of fuel (e.g. gasoline, diesel fuel, kerosene, heating oil) and the specification of the fuels (e.g. octane content, additives). The input may be transmitted, for example, by a console in a vehicle, a computer or thermostat in communication with a furnace, or a sensor in the fuel storage or transport system, or the input may be preset.

The fuel controller will adjust fuel flow rates based on one or more inputs from the one or more sensors. For example, additional fuel may be needed as the throttle is opened to allow more gas to flow into the intake manifold or the compressed gas source 308 is adjusted to allow more fuel into the turbulence chamber 304. On a more advanced level, fuel flow(s) can be controlled to minimize emissions. Emissions may be reduced through maintenance of a stoichiometric combustion reaction in which there is sufficient oxygen for the powdered fuel and any other fuel to oxidize completely (e.g., which may be evidenced by monitoring the oxygen emissions, i.e., excess oxygen in the emissions may indicate sufficient oxygen during the combustion process).

Additionally, the fuel controller will adjust fuel flow rates to maximize combustion device performance. For example, in an engine, powdered fuel may be particularly effective under conditions requiring less that 50% of the maximum engine horsepower produced when operating on 100% liquid fuel. Furthermore, maintenance of exhaust temperature below 500° C. may minimize ash production, thereby reducing valve fouling and/or particulate production.

Air flow rates for the fuel/gas dispersion may be adjusted in some embodiments, in most situations, the air flow rate need not be adjusted. This is because secondary air will in most instances be sufficient to ensure a stoichiometric dispersion. This is particularly true when using powdered fuel dispersions in combination with liquid fuels such as gasoline, which require much higher ratios of air to fuel.

In other embodiments, a fuel controller is not required for responsive powder distribution. A simple system has been fabricated without the use of a computer or other microprocessor. One or more gas flow sensors are positioned in proximity to the compressed gas source 308, turbulence chamber 304, throttle, or intake manifold. The gas flow sensor(s) measure the amount of gas entering the combustion device and generate electrical signals (e.g. DC voltage) which represent the measured gas flow. These electrical signals are used to control the powder dispersing device 306. For example, the powder dispersing device 306 may include a DC motor for rotating auger 312 and the motor speed may be governed in whole or in part by the electrical signals generated by the gas flow sensors.

In further embodiments, the kit may include a feedback loop wherein inputs from sensors such as exhaust sensors are used to control the powder dispersing device 306. By monitoring values such as the oxygen content of exhaust gases, the combustion device can be monitored to ensure that combustion is stoichiometric. The fuel mixture can then be adjusted if it is too lean or rich.

In addition, the dispersing shear rate should be monitored/adjusted immediately prior to flame ignition, as continued confinement of a completely dispersed suspension of particles in gas may lead to reagglomeration as the particles impact the walls of an 8 inch extension from the nozzle even if the internal diameter of the pipe is only ⅜ inch due to the chemical properties of PVC pipe. It is generally observed that if gas flow rates are in the range of 5 to 10 mph, larger particles and/or agglomerates may fall out of the gas stream, while gas flow shear rates in the range of 40 to 80 mph in embodiments with a ⅛ inch nozzle aperture are sufficient to re-disperse powder particle agglomerates.

In certain embodiments, the powder does not accumulate or encounter a restriction at any point after it leaves the hopper bottom until it is finally dispersed in a gas stream. For the horizontal auger system the powder should fall freely into moving auger flights rotating at a sufficient RPM so that the flights are not completely filled. If these flights are filled as the powder is advanced, the powder has a tendency to pack sufficiently to stop the auger motor. After the powder falls off the end of the auger tube it should fall without restriction directly into the dispersing gas jet chamber which leads directly to the high shear exit nozzle. Particular designs will avoid the accumulation of powder at any of these points. It is therefore possible that a drop down hopper can function without an auger if the powder drops down directly to the turbulence chamber 304.

For heating or other applications requiring a precise control of fuel supply rates over a range of a factor of ten, vertical auger systems in the intermediate storage tank may drive the powder into the ½ to 1 inch ID metering section (see vertical auger system schematics.) By varying the auger RPM, the powder supply rate can be increased from 5 grams per minute to 100 grams per minute. With different auger diameters, this 20 fold range can be shift, expanded, or contracted.

Embodiments of the inventions described herein may use either a gas flame pilot light or a continuous electric arc as the ignition source. The electric arc ignition source may be or resemble a conventional spark plug. Any ignition source may be incorporated with the nozzle 302.

With a particular drop down hopper configuration it was demonstrated with 200 mesh that the feed rate is partially controllable by varying the auger speed, but this control may be limited by the basic drop down powder feed rate, which is controlled, by the vibration and the shape of the hopper and the outlet opening. Thus, in certain embodiments, the basic intermediate hopper system used for furnaces may be sized for the powder used and the BTU rating for the unit.

In a specific embodiment, the dispersion of small, uncompacted agglomerates in an gas stream may be reduced to an explosible stream of individual particles using a gas flow rate in the range of 3 cubic feet/minute (cfm). The gas flow was obtained with a 3 psi gas pressure and a 1/16 inch nozzle aperture. The powder was dropped into the gas jet in a 1 inch diameter chamber that smoothly tapers from 1½ inch opening to nozzle exit opening of ⅜ inch. The powder-gas dispersion exiting this nozzle system showed no visible evidence of agglomerates with the use of 200 mesh powder and essentially complete combustion was obtained after ignition (less than 0.1% recovered after combustion).

FIG. **3*b* depicts a hopper and auger similar to those shown in FIG. 3*a*. As in FIG. 3*a*, hopper 310 is tapered. An auger 312 is located within the hopper 310. FIG. 3*b* depicts a plurality of longitudinal support members 320. These members 320 provide additional structural support to hopper 310 in some embodiments. Other embodiments of hopper 310** do not have support members, while other embodiments include support members that may be oriented in a variety of ways, for example, annularly.

B. Additional Exemplification

Another embodiment, system 400 depicted in FIG. 4, employs a drop down hopper 402.

A drop down hopper 402 is characterized by the absence of an auger for agitation and vertical movement of the powder contained within the hopper 402. Powder is primarily moved vertically by the force of gravity. To enhance movement of the powder and reduce the occurrence of agglomerates in the hopper, one or more vibrators 403 may be located in contact or in proximity to the hopper 402, the powder, and or both. This hopper 402 design may incorporate a mechanism for stirring the powder in the hopper 403.

Powder supply is delivered from a bulk storage tank 404 to the top of the drop down hopper 402 feeding the horizontal auger tube 406 that transports a metered quantity of powder to the end 408 of the auger tube 406 where the powder is dropped down to the turbulence chamber 409 and nozzle 410 as described above. Auger tube 406 houses an auger (not shown) powdered by a power source 411. The powder may be dropped any distance as may be desired for various embodiments. For example, the powder may be dropped 1 inch, 1-2 inches, 2 inches, 2-6 inches, 6-12 inches, and 1-12 feet. Alternatively, the gas flow to the turbulence chamber 409 may be delivered via a vacuum generating annular array of gas jets in which case the intermediate storage hopper 402 could be open to atmospheric pressure. The powder delivery rate is governed by the vibration and stirring applied to the hopper contents and the dimensions of the hopper 402 bottom (e.g. tapered) as well as the rotational speed of the auger (not shown) in tube 406. This design has the advantage of using a low gas flow and pressure drop and can be effective for powder flow rates as low as 50 grams/minute. Higher powder flow rates can be achieved with higher gas flow rates, nozzle diameters and higher powder delivery rates.

It is desirable for the gravity fed bottom opening of the drop down hopper 402 to be in the range of 1 inch diameter or larger. It is also desirable to remove the powder from this drop down exit area before it can accumulate. Thus the powder may drop down to the flights of a 1 inch diameter horizontal auger tube 406 or if the horizontal auger tube 406 is omitted, the powder may drop down to a gas jet (supplied by compressed gas source 407) leading directly to the dispersing nozzle 410 and the extension of nozzle if necessary. Upon departing the nozzle 410, the dispersion passes by an ignition source 411.

FIG. **4*a* depicts the horizontal auger tube 406, turbulence chamber 409, and nozzle 410 in greater detail. In one embodiment, auger tube 406 is a 1" diameter pipe housing an auger 412. The auger 416 operates to advance the powdered fuel until reaches point 408 where it falls into the turbulence chamber 409. In this embodiment, the turbulence chamber is a ¾" ID "T" fitting, with one end closed except for a 1/16" opening for a gas flow. The turbulence chamber is coupled with a nozzle 410. As depicted, the nozzle 410 may be coupled with an extension tube 416. Alternatively, the nozzle 410 may be coupled to the turbulence chamber 409 via the extension tube 416**.

In some embodiments, for example, where 80 mesh fuel is used, it may be advantageous to provide additional gas flow by ventilating the end 418 of auger tube 406. This may be accomplished in a variety of means, for example providing holes in end 418 or equipping end 418 with a removable cap. The means for ventilation may be adjustable.

Figure 5:
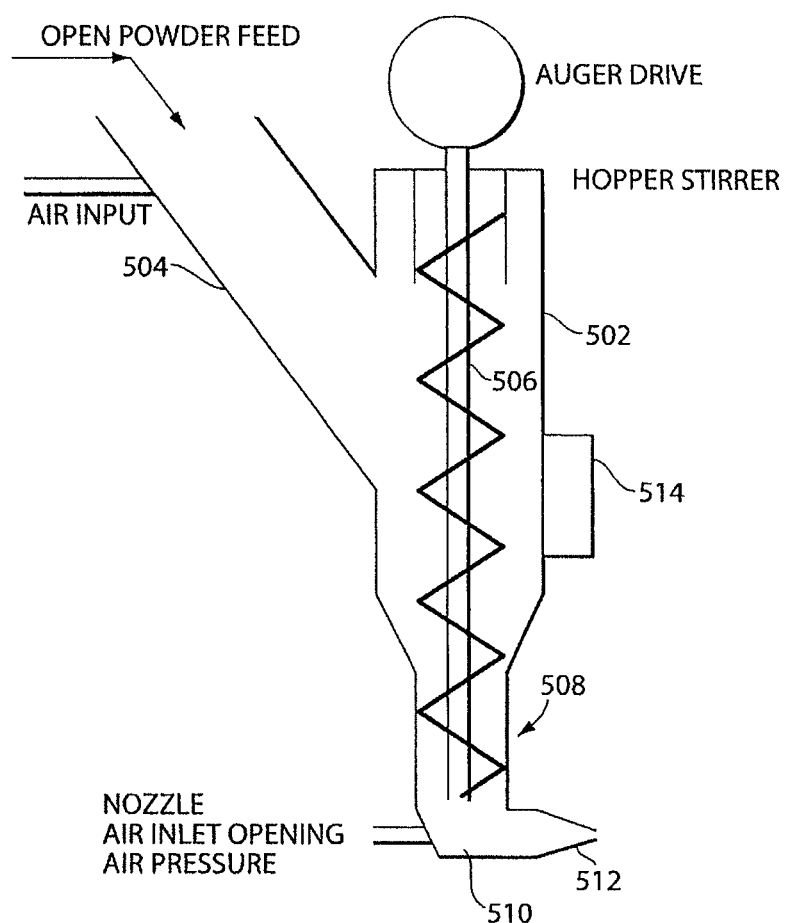
Figure 5A:
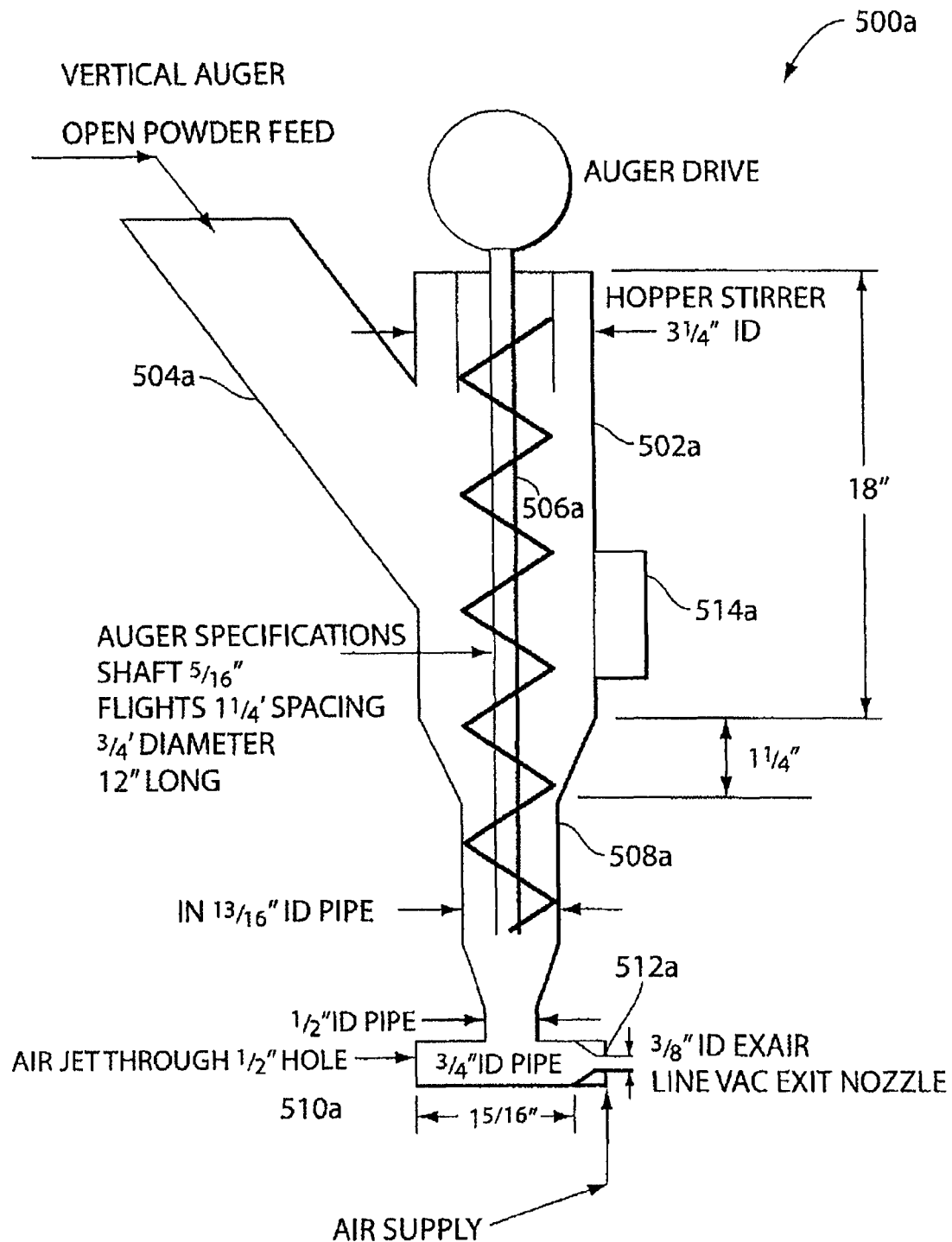
Figure 6:
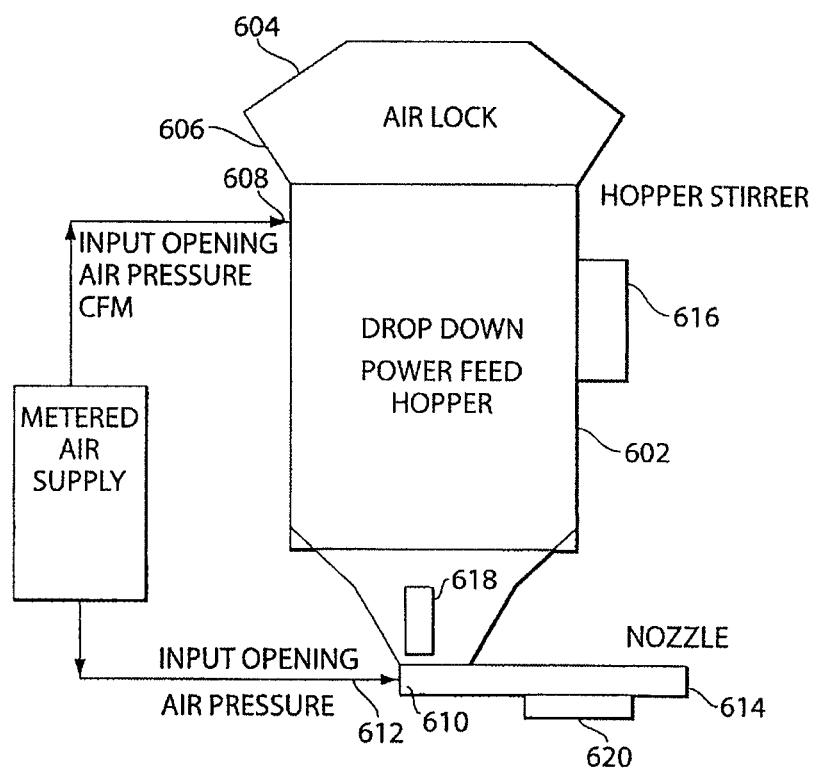

Another embodiment of the invention is depicted in FIG. 5. Again, a hopper is employed for distributing the powdered fuel. Powdered fuel is delivered to the angled side opening 504 of the hopper 502 through which a vertical auger 306 drives the powder down into the metering section 308 of the auger tube from which the metered powder flow drops to the gas jet dispersion chamber 510 whose exit leads to the nozzle 512. For continued powder supply from the storage hopper, it may be advantageous for all of the drop down systems to have a side entry port for powder delivery. Nozzle 512 may be a metal extension attached to the hopper 502. The end of nozzle 512 may crimped to a slot sufficient to re-disperse agglomerates formed in the nozzle extension. The powder delivery rate again is governed by the same intermediate hopper dimension factors as in FIG. 2 but the rate of powder delivery with this system can be directly controlled by the auger rpm. The length of the metering section 508 of the auger may be reduced depending on the powder used.

The embodiment depicted in FIG. 5 may have a variety of dimensions to reflect the many applications of the inventions herein. One possible embodiment, system 500*a* is depicted in FIG. 5*a*. Powder supply is delivered to the angled side opening 504*a* of the drop down hopper 502*a* with vibration (provided by vibrator 514*a*) and stirring by the vertical auger 506*a* which drives the powder down into the metering section 508*a* of the auger tube from which the metered powder flow drops to the turbulence chamber 510*a* whose exit leads to the nozzle 512*a*. The tapered dimensions of the hopper, the surface characteristics, the vibration, and the stirring ensure a smooth supply of powder to the auger which permits direct control of the rate of powder delivery by the auger rpm. The length of the metering 508*a* section of the auger may be reduced depending on the powder used.

The auger 506*a* in this embodiment is ⅞" diameter with 1¼" flight spacing and is enclosed in 1" internal diameter piping.

For the nozzle system using a single gas jet for dispersion, the powder is dropped down from the end of the auger into turbulence chamber 510*a*, which in this example is a ¾ inch ID tube that is 2 inches long. Alternative embodiments could use a "T" fitting for the turbulence chamber 510*a*. One end of the turbulence chamber 310*a* is plugged except for a 1⁄16" hole for connection with the gas source. The gas source provides a gas at a pressure of approximately 3 to 10 psi at a flow rate of approximately 1 to 3 cubic feet per minute. The other end of the turbulence chamber 510*a* leads to the nozzle 512*a*. In this instance, nozzle 512*a* has an aperture of 5⁄16 inch ID which opens to ¾" inch ID to couple with turbulence chamber 510*a* and has a length of 1½ inches. This system can be used effectively for both 200 mesh hardwood and 80 mesh pine, 325 mesh powdered grass as well as powdered sugar, starch, or flour.

In one embodiment of this system an Exair Line Vac provides an annular array of gas jets to aid in the evacuation of the dispersion chamber and may be used in place of the exit nozzle described above. The ½ inch ID opening of the Exair outlet is reduced to ⅜ inch ID with plastic tubing.

The above embodiment, like other embodiments described herein may be assembled from a variety of components. In the above example, a Nordson #900650c CHO6F extension hose, available from Nordson Corporation of Westlake, Ohio, was coupled with the nozzle. Vibrators 514, 514*a* were fabricated from 12 volt DC fan motors operating at approximately 1,800 rpm with 10 gram weights offset approximately 3' from the shaft. 12 volt DC fan motors geared down to produce approximately 20 rpm of the stirrer blade power the auger.

Another embodiment of the invention is depicted in FIG. 6. Again, a hopper 602 holds and dispenses the powdered fuel. The powdered fuel may be delivered via an air lock 604 above the angled side opening 606 since a second gas supply 608 may be used to assist in moving the powder to the drop down gas dispersion nozzle chamber 610. Alternatively, the gas flow 612 to the dispersing nozzle 614 may be delivered via a vacuum generating annular array of gas jets in which case the intermediate storage hopper 602 could be open to atmospheric pressure. An auger is not required in these systems. Vibrators 616, 618, 620 may apply vibration to the hopper walls and stirring of the contents to ensure consistent powder flow to the dispersing chamber 610 below the hopper.

Yet another embodiment of invention is depicted in FIG. 7. As in the previous embodiments, a hopper 702 holds and dispenses the powdered fuel. The depicted embodiment includes an optional angled side opening 704. Unlike the previously described embodiments, system 700 includes an internal mixer 706 for stirring the powdered fuel. A gear motor 708 may drive the mixer.

All of the schematics noted above are depicted with either an air lock system to supply the hopper with powder or an open side port powder delivery point. In certain embodiments an air lock is used when a gas supply is introduced into the hopper. In alternate embodiments, the angled side port is used, e.g., with any of these systems.

The above embodiment, like other embodiments described herein may be assembled from a variety of components. In the above example, the internal mixer 706 is stirred with a StrikeMaster model V06829AA83 24 volt DC motor, available from StrikeMaster Ice Augers of Big Lake, Minn., geared to produce approximately 15 rpm. The auger motor is a Denso 12 volt 10u R730557-7030 motor, available from Denso Corporation of Aichi, Japan, set to operate at approximately 160 rpm at 12 volts.

The auger shaft tubing is ¾" PVC pipe available from Charlotte Pipe and Foundry Company of Charlotte, N.C. Other pipe components listed throughout refer to PVC pipe with specific internal diameters where specified. However, the examples described herein are examples provided to illustrate the concepts of the inventions. For this reason, any material known to those of skill in the art, for example, stainless steel, can be substitute for PVC or any other component described herein.

FIGS. 8*a*-8*f* depict several rotary disks 800, 806, 812 for positive placement powder dispersing. Each disk 800, 806, 812 includes a plurality of recesses 802, 808, 814 for receiving a volume of a powdered fuel. As depicted in FIGS. 8*a*-8*f*, a variety of patterns may be utilized to achieve particular objectives such as powder dispersion rate and powder dispersion patterns. In some embodiments, the rotary disks include a central opening 804, 810, 816 for mounting and rotation.

FIG. 8*g* depicts a positive displacement powder dispersing system comprising a rotary disk 816 and a hopper 818. The rotary disk 816 rotates to disperse a controlled amount of powdered fuel. As the rotary disk 816 rotates, recesses in the rotary disk 816 align with one or holes in a plate (not shown) at the bottom of the hopper 818, allowing powdered fuel to flow into the recesses. As the rotary disk 816 continues to rotate, centrifugal force causes the powder to disperse from the rotary disk 816. In some embodiments, the hopper 818 includes an auger comprising a shaft 822 and one or more blades 824. In some embodiments, the shaft 822 rotates the rotary disk 816. In further embodiments, the hopper may include a vibrator 826 for promoting powder flow. In some embodiments, vibrator 826 may produce ultrasonic (ultrasound) waves. The rotary disk 816 (and, in some embodiments, the auger) is rotated by an electric motor, a servo, or other power source.

Figure 8A:
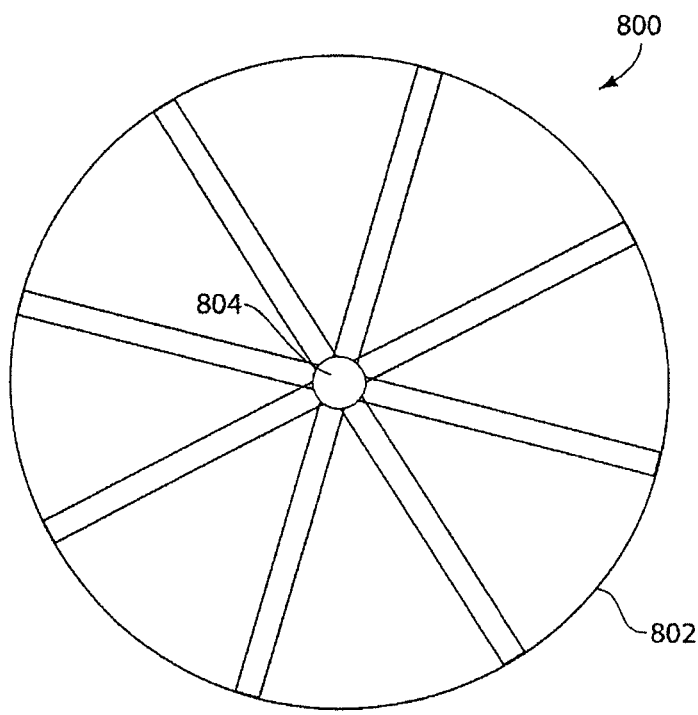
FIGS. 8a-8h depict components and embodiments of exemplary positive displacement powder dispersing devices comprising a rotary disk.
Figure 8B:
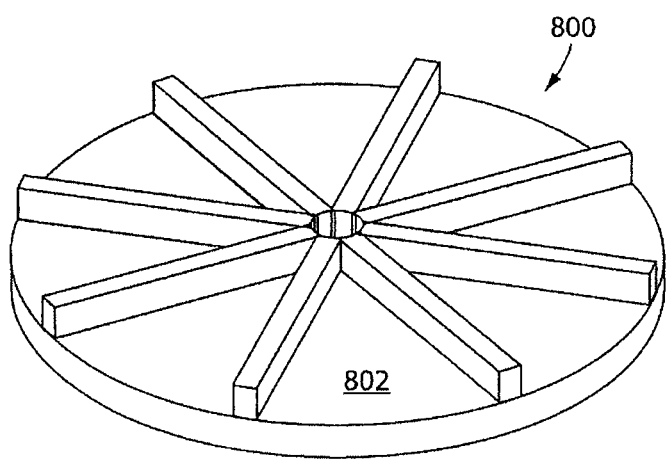
Figure 8C:
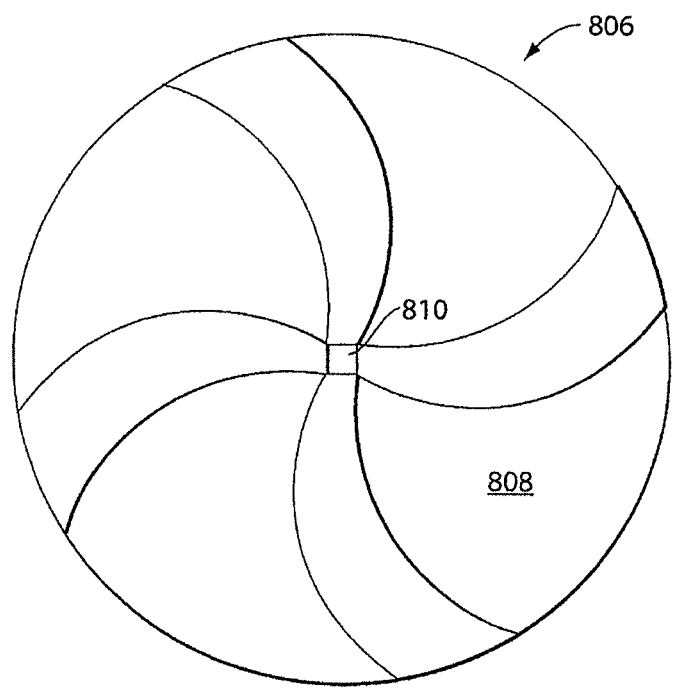
Figure 8D:
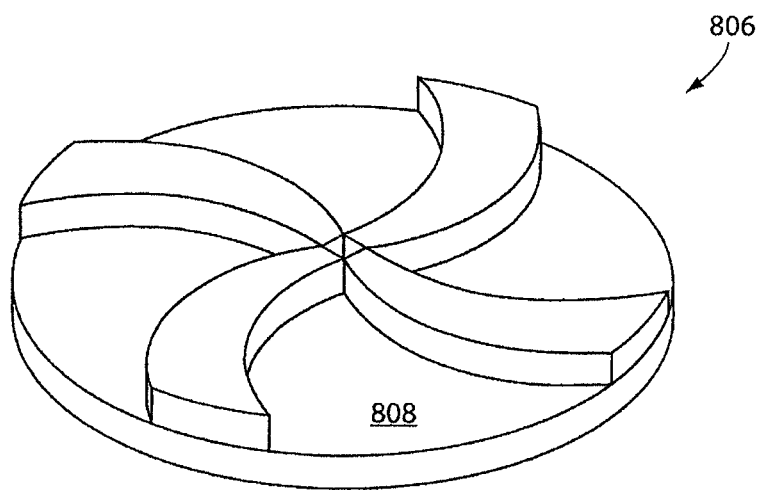
Figure 8E:
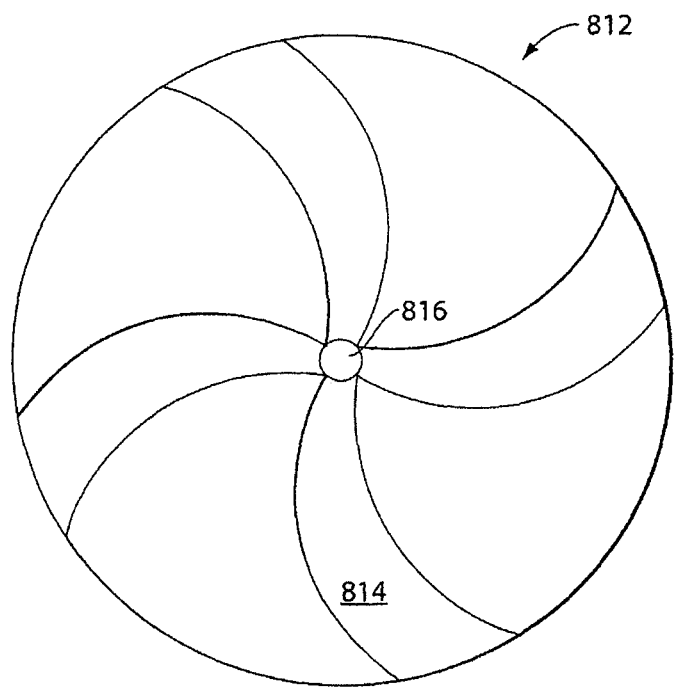
Figure 8F:
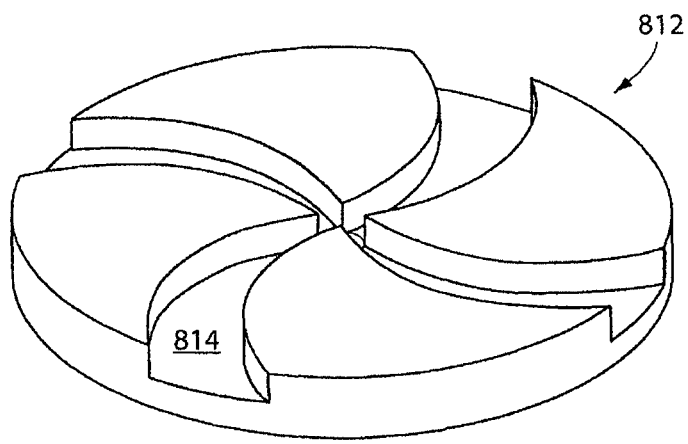
Figure 8G:
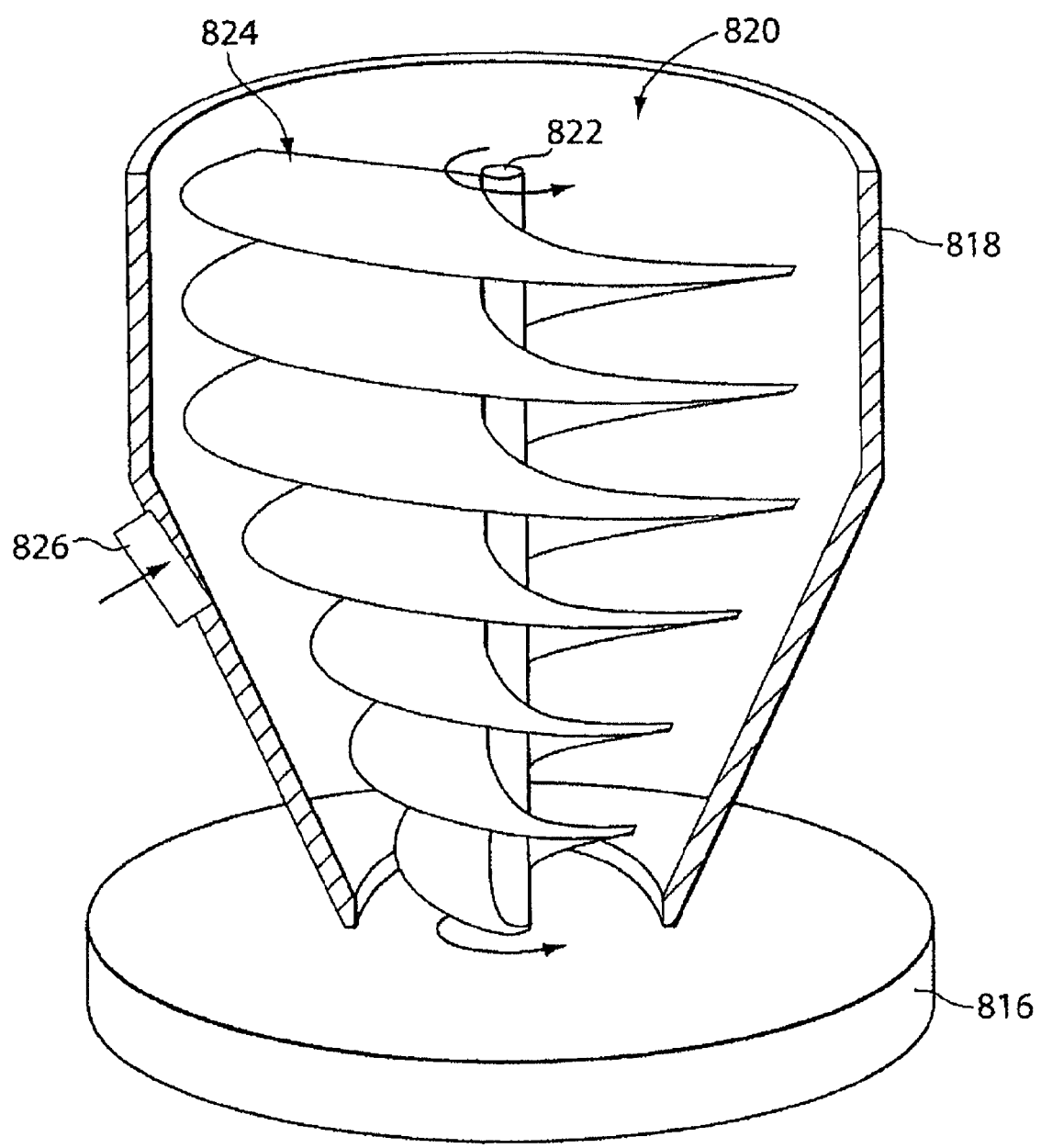
Figure 8H:
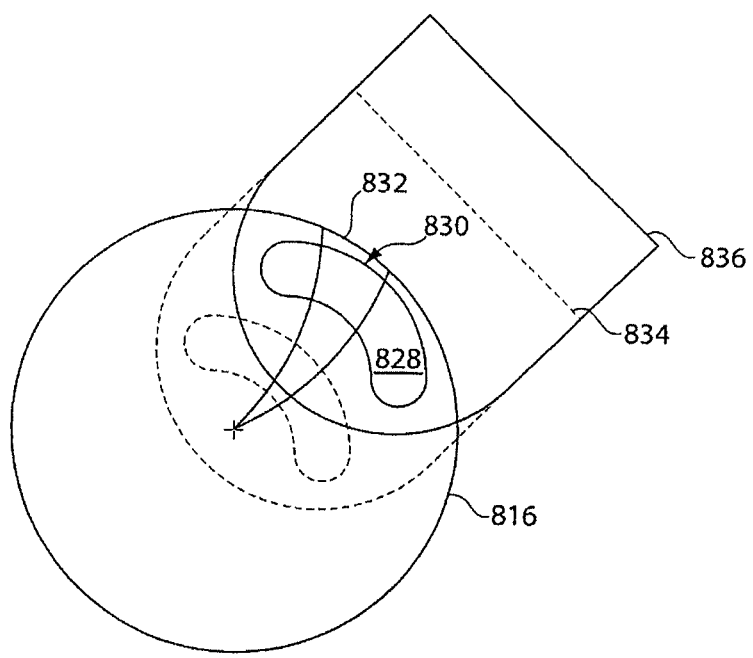

FIG. 8*h* depicts the interaction between the plate at the bottom of hopper 818 and rotary disk 816. As described, the plate includes a hole 828. In the hatched region 830, the hole 828 and recess 832 of the rotary disk 816 align and powder flows into the recess 832. As the rotary disk 816 spins, the powder is dispersed by centrifugal force. The dispersal pattern may be adjusted by adjusting the rotational speed of the rotary disk 816. For example, dashed line 834 represents a radius of dispersal at lower rotational speeds while line 836 represents a radius of dispersal at higher rotational speeds.

In some embodiments, a powder dispersing system may include a rotary wire brush mounted within the hopper or below the hopper to fluidize any agglomerates that may form in the powder. Suitable brushes are available from a variety of produces including DEWALT Industrial Tool Co. of Baltimore, Md.

Other positive displacement powder dispersing devices may be used in embodiments of the inventions herein. In a reciprocating positive displacement powder dispersing devices, a stationary slide is mated directly below a reciprocating slide. When aligned, the one or multiple mini portions of powdered fuel are simultaneously released from the upper metering slide, and fall through the lower mask slide, either into an air stream for immediate dispersion, or onto a conveyor belt or shelf or table for subsequent dispersion using techniques described elsewhere herein. A major benefit of this embodiment is the conversion of mini, well controlled portions of explosible powder into a continuous stream flow for accurate volumetric feed control.

In another embodiment, linear auger systems are used to fill the powder dispersing devices. One or more linear augers feed a plurality of powder dispensing devices which may be located in proximity to each other. For example, in an inline four cylinder engine, a single linear auger may feed four powder dispensing devices. In another example, in a V-8 engine, a first linear auger may feed four powder dispensing devices on one side of the engine while a second linear auger system feeds the other four powder dispensing devices on the other side of the engine. This linear auger system is particularly compatible with the discrete cylinder feed system depicted in FIG. 13*a* and described herein.

A variety of control techniques are available to insure mini-hopper supply. In the simplest embodiment, for a four cylinder PDPD configuration, a near continuous stream of powder would pass over each hopper, driven by the long auger, with powder dropping out in response to the available room, to maintain full mini-hoppers, which fill with priority from the nearest to the farthest from the supply system. Level sensing on the farthest hopper, in communication with the powder supply system, ultimately controls the feed frequency and rate.

Another embodiment employs a stacked multi-disk hopper metering for continuous and smooth PDPD powder feeding. This system employs three disks stacked below a hopper to perform a discrete sequence of metering, handling and linear dispersion functions in sort of a "bucket brigade" fashion. Each is a mask and an outlet for the next. The top disk has one or more through slots along the radius/diameter line to establish the feeding zones and set the maximum volume. In the simplest embodiment, this disk is stationary, although this is not a firm requirement, as the disks may be geared together in rotational ratios to better accomplish the same function.

In operation, powder falls through the aperture slots of the first disk, and rests on the solid blank surface of the second disk, in intimate contact just below, while the second, identically slotted lower disk continues to rotate. When the slots of the second lower disk align with the stationary top disk, the volume of powder immediately falls into the slotted cavities of disk #2. Its bottom is formed by the blank surface of the third or lowest rotating disk. Disk #3 rotates at a greater speed in ratio with disk #2. Disk #3's slots are configured at an angle, rather than radially, for linearly transferring the powdered fuel through and out of the angled slot on disk #3.

The net result is a continuous volumetric flow of powder that is then dispersed into the zone below disk #3 and entrained into an air/powder dispersion using methods described elsewhere in this application. The result is a uniform, smooth and non-pulsing flow. Ultrasonic energy may aid in the highly accurate performance of this embodiment. This three disk assembly can be fabricated by anyone skilled in the art using ratio type gear drives, and function over a wide range of speed when driven by a DC or other drive under electronic control.

In another embodiment, the powder dispersing device comprises a volumetric rectangular "ladder" or pocket conveyor metering feed system. This embodiment uses a volumetric approach, a type of pocket conveyor, to remove known quantities of powder material from a round, oval or rectangular surge or supply hopper above. This hopper is supplied by a remote system using level sensing for powder supply control and vibration, for example ultrasonic vibration, to insure uniform flow into the metering device over time and the wide dynamic range of operation.

A "ladder conveyor" involves use of a linear chain type conveyor with divided, segmented "rungs" to create a series of known volumes for powder metering. These "rungs" may be thin metal blades or other dividing "walls" for easy connection with the flexible transport chain mechanism and smooth contact with the hopper surfaces. This dividing blade chain may be integrated with the flexible bottom of the conveyor to form one continuous assembly, or ride atop a more traditional conveyor belt running at the same speed, which forms the bottom of the 4"pocket" volume.

A major advantage of this approach is its ability to provide a continuous supply of premeasured volumetric portions of explosible powder, while running in a variable speed mode and driven by a DC or pulsed stepper motor over a wide dynamic range of flow conditions and rates.

Figure 9:
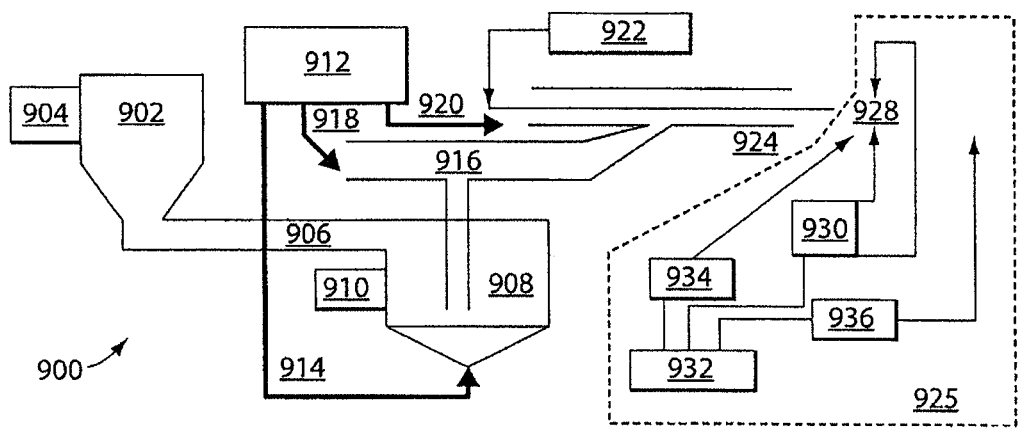
FIG. 9 depicts an embodiment of a powder dispersing system comprising an aspirating powder pump.

FIG. 9 depicts another embodiment of a kit/system 900 for dispensing powdered fuel. A powdered fuel storage hopper 902 is provided for storage of powdered fuel. A vibrator 904 is attached to the hopper 902 to provide agitation to promote the flow of the powdered fuel. The powdered fuel flows from the hopper 902 into an auger-driven feed line or conduit 906, which moves the powdered fuel into an intermediate powder storage tank 908. A vibrator 910 is coupled with intermediate powder storage tank 908 to agitate the powdered fuel. Compressed gas is pumped from compressed gas source 912 into intermediate powder storage tank 908 to fluidize the powder. In some embodiments, the compressed gas enters the bottom of the intermediate powder storage tank 908. In other embodiments, the compressed gas enters tank 908 from other regions such as the sidewall or the top.

An aspirating powder pump 916 extends into the intermediate powder storage tank 908. The pump 916 receives a compressed gas flow from conduit 918. The pump 916 draws powdered fuel up from tank 908 through the Venturi effect wherein fast moving gas through the pump creates a local reduction in gas pressure that allows powdered fuel to flow upward. The powdered fuel drawn from tank 908 by pump 916 may be mixed with addition gas from conduit 920. The compressed gas and/or powdered fuel mixture may be electrically charged by electrode 922, which may, in some instance be a high voltage electrode.

Figure 10:
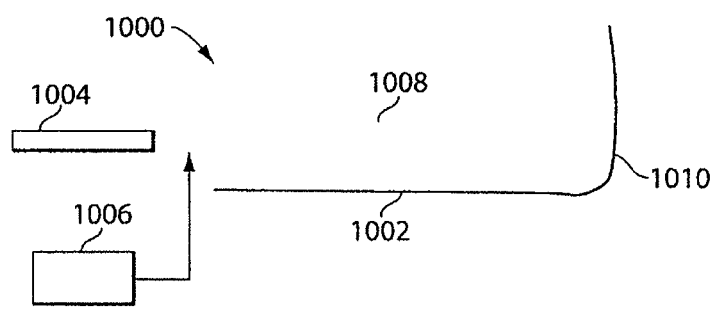
FIG. 10 depicts an embodiment of a burner system comprising a flame cradle.

The powdered fuel mixture is transported in conduit 924 to a combustion device 926. Combustion device 926 may include a wide variety of devices as described herein such as a furnace or an engine. In this particular embodiment, the combustion device 926 comprises an electric arc device 928 for igniting the powdered fuel mixture. A generator 930 may power the electric arc device 928. A control system 932 may be control the electric arc generator 930 and may be coupled with sensors such as light or heat sensors 934, 936 to detect the presence of an arc and/or a flame. Control system 932 may be coupled with any of the other components in system 900 to control and/or coordinate the production of the powdered fuel mixture FIG. 10 depicts a flame cradle and deflector for use with the systems and methods described herein. The use of such a cradle increases the combustion of powdered fuel, particularly if powder particles larger than 200 mesh are included in the powdered fuel. If particles do not completely combust as the powder-gas mixture is sprayed out of the nozzle 1004 and ignited by the ignition source 1006, the particles will fall to the flame cradle, which is positioned in close proximity to the flame 1008. Lying on the cradle 1002, the unburned particles are exposed to high heat and combust.

For example, it has been demonstrated that using 80 mesh softwood, with an fuel flow rate of less than 3 cubic feet per minute (cfm) and a nozzle pressure of 8 psi, approximately 4% of the powder fell out of the flame without completely combusting. The use of the flame cradle resulted in complete combustion of these particles.

Furthermore, the flame cradle 1002 may also serve as a deflector through the addition of a curved or angled end 1010. When employed in a furnace embodiment, the cradle/deflector will deflect the flame upward towards the boiler. The cradle/deflector may be of any dimensions suitable for use in a particular combustion device; for example, the cradle could be 6 inches wide and 10 inches long with an upward deflector extending 5 inches at the end.

The flame cradle 1002 may also improve the efficiency of the combustion device by reflecting energy that may otherwise be lost in the direction of the flame cradle. To enhance this feature, embodiments of the flame cradle 1002 may be treated with a reflective coating. In other embodiments, the flame cradle 1002 may comprise an insulating material to limit heat loss through the flame cradle 1002. Exemplary insulation materials include, but are not limited to, fiberglass and ceramics.

The ignition source 1006 may be any device capable of igniting the fuel mixture, for example a pilot light or flame such as a pilot consuming methane or propane, and electrical spark or arc. If the upper surface of the flame cradle 1002 is a heat retaining and/or heat conducting material such as a solid ceramic, the flame cradle 1002 may provide sufficient heat to ignite the fuel/gas dispersion. In this embodiment, ignition source 1006 would only be needed for a cold start.

V. Powdered Fuel Adapted Furnace

In contrast to the addition of a kit to an existing device to adapt it to utilize a powdered fuel source, changes to a device for utilization of a powdered fuel may be incorporated into any device's primary design. Such primary designs and methods of modification, e.g., designs that allow for the use of the powdered fuel of the present invention, are intended to be within the scope of the present invention.

As such, one particular embodiment provides a furnace adapted to operate using the energy source described herein through the deflagration of powdered fuel, the furnace comprising:

a nozzle;

a turbulence chamber coupled with the nozzle;

a powder dispersing device coupled with the turbulence chamber; and a compressed gas source coupled with the turbulence chamber. In particular embodiments, the nozzle and the turbulence chamber may be directly coupled or coupled by a first conduit. Additionally, the powder dispersing device and the turbulence chamber may be directly coupled or coupled by a second conduit. Moreover, the compressed gas source and the turbulence chamber may be directly coupled or coupled by a second conduit.

The powder dispersing device may comprise a hopper, e.g., wherein the hopper comprises an air lock, which may further comprise a vibrator in contact with the hopper. The hopper may be tapered. In addition, the powder dispersing device may further comprise an auger positioned within the hopper; and a power source connected to the auger to rotate the auger. Alternatively, the powder dispersing device further comprises a horizontal auger positioned below the hopper. In particular embodiments, the powder dispersing device further comprises a mixer located within the hopper.

In additional embodiments, the furnace of the present invention may further comprise an ignition source, a flame cradle, a heat exchanger, and/or a boiler. In certain embodiments, the ignition source produces an electrical spark. In certain embodiments, the ignition source is a pilot light.

The invention may be further clarified by utilization of an exemplary embodiment and modifications thereto, the modification of which should be understood as applicable to kits in general.

A. Exemplification and Modifications Thereof

Figure 11:
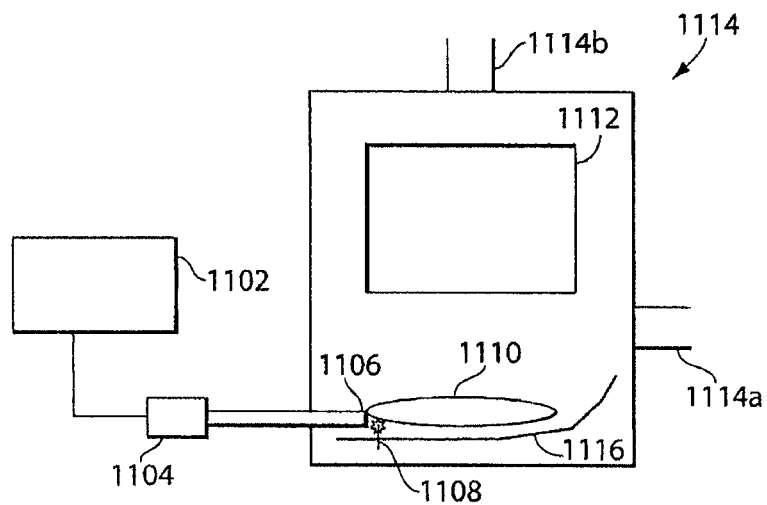
FIG. 11 depicts an embodiment of a powdered fuel furnace.
Figure 12:
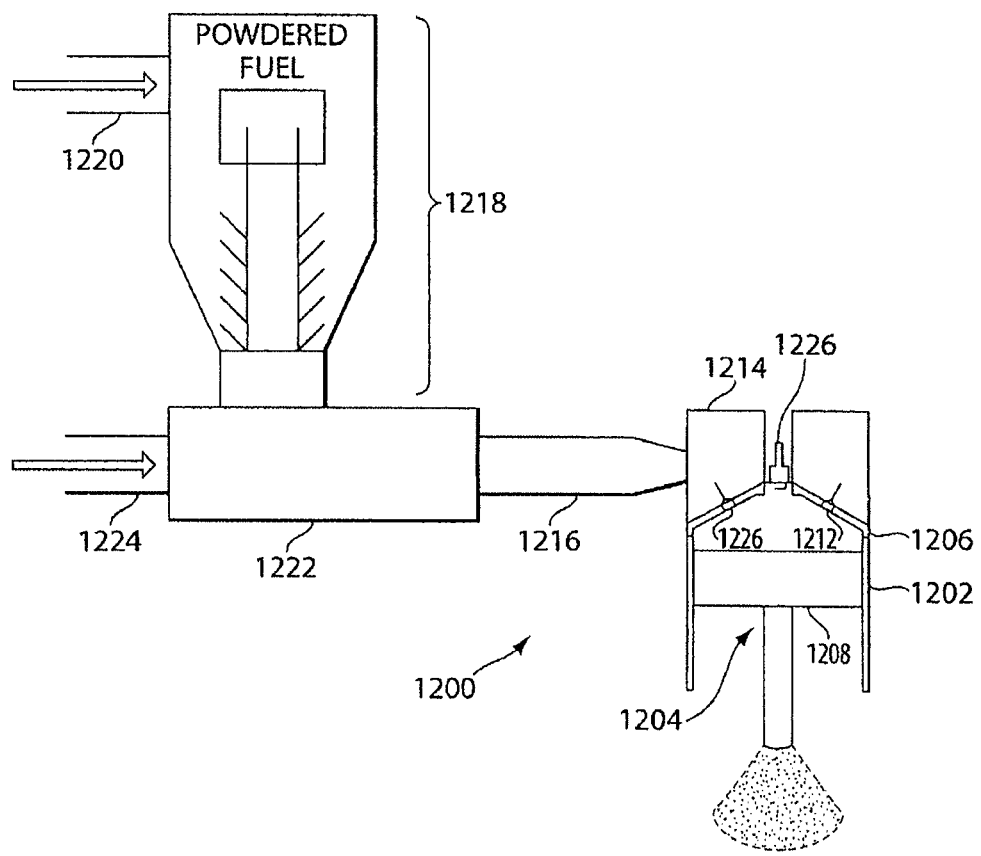
FIGS. 12, 13a, 13b, and 13c depict embodiments of a powdered fuel engine.

FIG. 11 depicts an embodiment of a powder fuel adapted furnace 1100. The furnace 1100 may be fabricated specifically, in primary design, for powdered fuels and/or liquid fuels or the furnace 1100 may be adapted for use of powdered fuels, for example through use of one of the kits disclosed herein. A powder distribution device 1102 is provided, as is described herein. The powdered fuel distribution device 1102 provides powder to a turbulence chamber 1104 in which the powdered fuel is dispersed with a gas. The fuel mixture is released into furnace 1100 by nozzle 1106, where it is ignited by an ignition source 1108. As discussed herein, the ignition source 1108 may be any known device for igniting fuels including electrical sparking devices such as spark plugs and piezoelectric devices, and pilot lights. A flame 1110 is generated.

The heat generated from the combustion of the powdered fuel may be utilized in various ways depending on the furnace 1100. In boiler-type furnaces, subsystem 1112 is a tank containing a liquid such as water, which is boiled to produce steam. This steam used to heat the desired area. In other furnaces, such as forced hot air systems, subsystem 1112 is a heat exchanger in which hot combustion gases generated by flame 1110 pass over the heat exchanger to provide heat. Furnace 1100 may include one or more flues 914a, 914b to vent combustion gases such as carbon dioxide. The location of flues may be affected by the type of furnace and other considerations such as the available dimensions for installation of furnace 1100.

In some embodiments, furnace 900 includes a flame cradle 1116. As discussed herein, the flame cradle promotes more efficient combustion of powdered fuel by capturing unburned particles for further burning by flame 1110.

VI. Powdered Fuel Adapted Engines

Another particular embodiment provides an engine, e.g., adapted to operate using the energy source described herein through the deflagration of powdered fuel, comprising a cylinder defined by a cylinder block having a bore; a cylinder head, coupled to the top of the cylinder block; and a piston received in the bore of the cylinder block;
  an intake valve in communication with the cylinder head;
  an intake manifold adjacent to the intake valve;
  a powder dispersing device; and
  a gas flow sensor.

In some embodiments, the powder dispersing device is coupled with the intake manifold. In these embodiments, the intake manifold provides sufficient air flow and/or turbulence for the dispersion of powdered fuel in air and effectively replaces the turbulence chamber. Powder dispersion may be enhanced by adding one or more throttle plates within the intake manifold, for example, in proximity to the interface between the powder dispersing device and the intake manifold.

Another embodiment provides an engine, e.g., a four-stroke engine or a two-stroke engine, comprising:

a cylinder defined by a cylinder block having a bore; a cylinder head, coupled to the top of the cylinder block; and a piston received in the bore of the cylinder block;
  an intake valve in communication with the cylinder head;
  an intake manifold adjacent to the intake valve;
a nozzle for dispersing an explosible mixture of gas and powdered fuel, e.g., wherein the nozzle is
a Venturi aspirator or a powder spray pump;
  a turbulence chamber coupled with the nozzle;
  a powder dispersing device coupled with the turbulence chamber;
  a gas source coupled with the turbulence chamber; and
a gas flow sensor, e.g., a mass flow sensor. The nozzle may, for example, be coupled with the intake manifold and/or with the cylinder. In particular embodiments, the gas flow sensor is selected from the group consisting of a vein meter mass flow sensor, a hot wire mass flow sensor, a cold wire mass flow sensor, and a membrane mass flow sensor. In certain embodiments, this gas flow sensor may be located within the intake manifold, coupled with the intake manifold, and/or communicatively coupled with the powder dispersing device. In certain embodiments, the speed of the powder dispersing device is governed by the gas flow sensor.

In certain embodiments, the engine is of a type selected from the group consisting of five-stroke engine, six-stroke engine, Bourke engine, rotary engine, and Wankel engine.

Multiple embodiments of the components are considered herein. For example, engines of the present invention may have one-to-one ratio of nozzles to cylinders, further comprise an electrode for charging the powdered fuel, or the cylinder block, and further comprise a colloidal dispersion of graphite in oil, the dispersion located on the bore of the cylinder block, e.g., wherein the colloidal dispersion comprises 300 mesh graphite powder in oil. The engine may also further comprise a liquid fuel nozzle, e.g., a Venturi aspirator, coupled with the intake manifold for dispersing a liquid fuel, e.g., wherein there is a one-to-one ratio of liquid fuel nozzles to cylinders. In another embodiment, the engine of the invention may further comprise a throttle plate located within the intake manifold and adjacent to the intake valve.

In additional embodiments, the engine may further comprise a liquid valve coupled with the cylinder head, the liquid valve adapted to release water into the cylinder before, at, and/or after ignition of the explosible mixture. The fluid may be a water, a lubricant, and/or a substance that promotes combustion. Suitable substances for promoting combustion include starting fluids such as those comprising dimethyl ether. The engine may also further comprise a lubricant valve coupled with the cylinder head.

In a particular embodiment, the engine comprises one or more sensors selected from the group consisting of engine temperature sensors, engine speed sensors, throttle sensors, intake temperature sensors, exhaust temperature sensors, intake gas sensors, exhaust gas sensors, mass airflow sensors; air/fuel ratio sensors; fuel flow sensors; oxygen sensors; accelerometer sensors; powder supply sensors; acoustic sensors; powder sensors; vacuum sensors; pressure sensors; position sensors; injector-on time sensors; powder feed speed sensors; static charge sensors; humidity sensors; moisture sensors; particle size sensors; and knock sensors.

The engine may also include a fuel controller communicatively coupled with the one or more sensors and adapted to adjust the quantity of the explosible mixture released from the nozzle. The fuel controller may be used to adjust the quantity of the explosible mixture to maintain at least a minimum percentage of oxygen in exhaust gases, or to maintain exhaust gas temperatures below 500° C. In certain embodiments, the fuel controller is a closed-loop system.

In some embodiments, the engine may include a user interface communicatively coupled with the fuel controller. The user interface may be configured to allow a user to select a desired fuel and/or fuel blend. In some embodiments, the user interface may allow the user to override the fuel controller and manually select the properties of a fuel and/or fuel blend. Such a configuration may be advantageous for cold weather starting and/or if the engine is "flooded" with powder.

The user interface may be any interface as is known to those of skill in the art. The interface may be a simple analog controller such as analog devices available from Split Second of Santa Ana, Calif. Other embodiments of user interfaces may comprise digital controls and/or displays including, but not limited to, light emitting diodes (LEDs), liquid crystal displays (LCDs), and touch screen interfaces.

The engines of the present invention may be specifically adapted to use of a powdered fuel described herein. For example, the engine may be adapted for using hardwood particles, softwood particles, or grass particles, as described herein.

The invention may be further clarified by utilization of an exemplary embodiment and modifications thereto, the modification of which should be understood as applicable to kits in general.

A. Exemplification and Modifications Thereof

Another embodiment of the inventions described herein is an internal combustion engine optimized to operate partially or entirely on powdered fuel. The concepts described herein are applicable to any type of internal combustion engine, such as a two-stroke engine, four-stroke (Otto or Diesel cycle) engine, five-cycle engine, six-cycle engine, Bourke engine, rotary engine, and Wankel engine. For efficiency, the descriptions herein describe a four-stroke engine adapted to deflagrate powdered fuel unless otherwise described.

Figure 7:
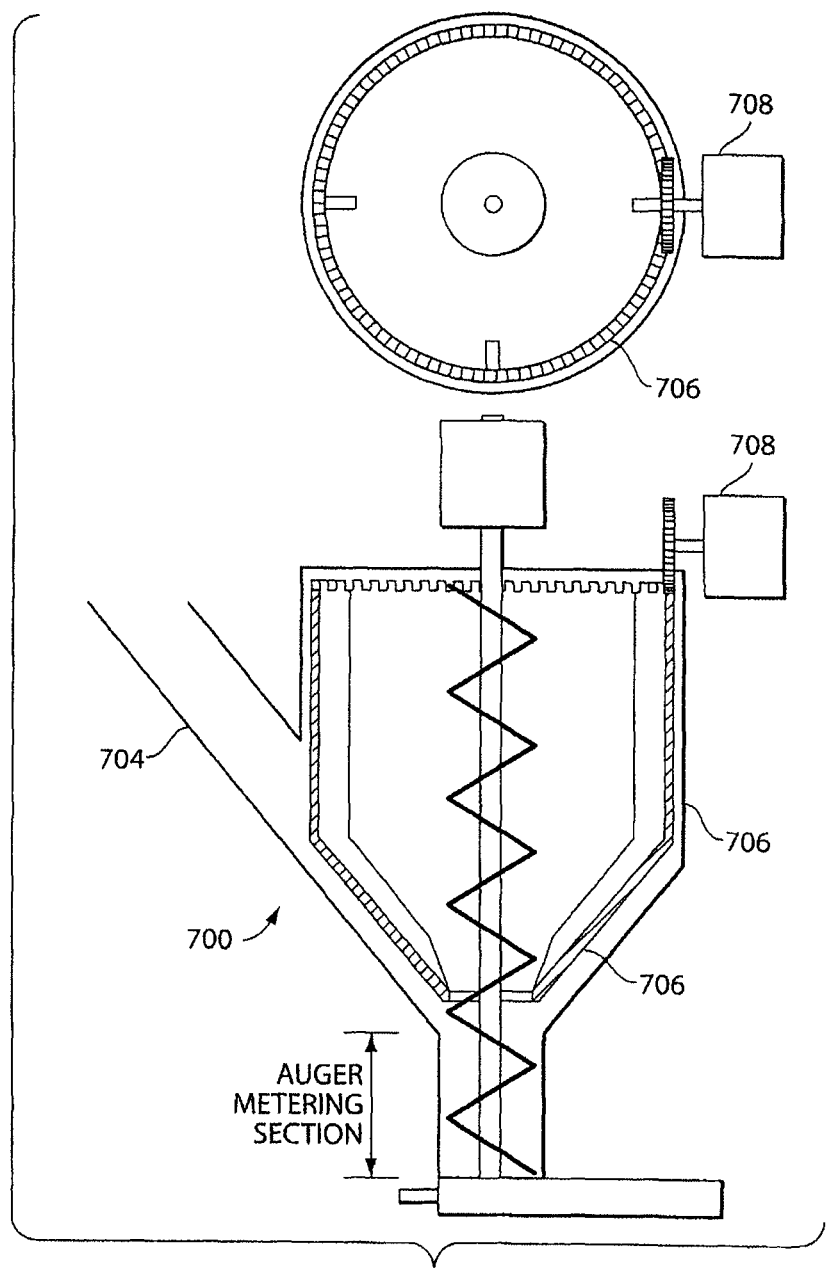

As depicted in FIG. 7, a four-stroke engine 1200 may contain one or more cylinders defined by a cylinder block 1202 having a bore 1204, a cylinder head 1206 coupled to the top of the cylinder block 1202, and a piston 1208 received in the bore 1204 of the cylinder block 1202. Typically, multiple cylinder blocks 1202 are combined in a single cast and machined engine block or an engine block formed from one or more modules. The cylinder block/engine block may be made from a variety of materials, such as cast iron and aluminum.

An intake valve 1210 and an exhaust valve 1212 are coupled with the cylinder head 1206 to allow gas, fuel, and exhaust to enter and exit the cylinder. Valves 1210, 1212 and valve train assemblies for operating the intake and exhaust valves 1210, 1212 are well known and any existing or later discovered valve train technology such as valves actuated by overhead camshafts, cam-in-block systems (pushrod systems), and camless valve trains using electronic systems such as solenoids may be adapted in these embodiments.

The intake valve 1210 is adjacent to an intake manifold 1214 where a fuel gas mixture is present. The fuel mixture may various comprise fuels at different quantities and/or ratios at different points during engine 1200 operation. For example, at startup, the engine may burn a mixture of air and liquids such as gasoline, diesel fuel, kerosene, and/jet fuel. At other times, the engine 1200 may burn air and a mixture of liquids and powdered fuel. At other times, the engine 1200 may burn a mixture of air and powdered fuel. To facilitate these multi-fuel capabilities the intake manifold 1214 is in communication with one or more nozzles 1216 for dispersing a powder-air mixture. The intake manifold 1214 may also be in communication with one or more fuel injectors or carburetors (not shown) for dispersing a liquid-air mixture. The nozzle(s) 1216 may be located on the intake manifold 1214 wall and there may be multiple nozzles 1216, for example one nozzle 1216 in proximity to the intake valve 1210 for each cylinder. Alternatively, there may be less than one nozzle 1216 per cylinder. This nozzle 1216 may still be located on the intake manifold 1214. Alternatively, to the extent that the engine 1200 uses a throttle valve or a carburetor (not shown) that is not considered part of the intake manifold 1214, the nozzle(s) 1216 may be located in proximity or in connection to the throttle valve (throttle body) or the carburetor. The nozzle(s) 1216 may be any type of nozzle described here or throughout this application. Particular applications may use a Venturi aspirator or a powder spray pump.

In some embodiments, intake manifold 1214 may be omitted and nozzle(s) 1216 may be directly coupled with the cylinder head.

In other embodiments, individual throttle plates are located within the intake manifold 1214 and adjacent to the intake valve(s) 1210. The throttle plates may act to regulate gas flow into the cylinder through the intake valve 1210 and/or create a turbulent gas flow for better powder distribution. Moreover, in certain embodiments, the throttle plates may allow the intake manifold to operate at standard atmospheric conditions, namely standard atmospheric pressure as opposed to below standard atmospheric pressure. By ensuring that the intake manifold remains at standard atmospheric pressure, the powder dispersion system in this embodiment can better regulate flow because powdered fuel will not be pulled through the auger by a pressure gradient between the intake manifold and the powder distribution system.

In certain embodiments, to facilitate responsive performance, particularly on acceleration, a powder distribution system 1218 may be placed in close proximity to the engine 1200, and more particularly, a powder distribution system may be placed in proximity to each intake valve 1210, for example by mounting the powder distribution system 1218 on the outside of the intake manifold 1214. Powder distribution systems are discussed in greater detail herein. As discussed above, the powder distribution system(s) 1218 may be fed powdered fuel through a conduit 1220 from a larger powder distribution system (not shown). In some embodiments, the larger powder distribution system may be located in the rear of the vehicle while the engine 1200 and the smaller powder distribution system(s) 1218 are located in the front of the vehicle, thereby preserving valuable space near the engine.

The powder distribution system 1218 dispenses a controlled volume of powdered fuel to a turbulence chamber 1222 where the powder is mixed with gas from a compressed gas source (not shown), in some embodiments, via conduit 1224. Compressed gas sources are described herein. In particular embodiments, the compressed gas may be provided through a turbocharger powered by exhaust gases from the engine. Turbochargers are well known in the art and not described further. The flow rate for the compressed gas may be set to any rate sufficient to create a powder-gas mixture, but generally will be below 8 cfm.

The flow rate from the powder distribution system 1218 may be modified by the addition of a variable resistor, for example a 10 ohm variable resistor, to the power supply circuit for the powder distribution system 1218. Gas flow rates need not necessarily be modified as the dispersion and transport gas supply may only be a small fraction the engine intake gas.

The operation of a four-stroke engine is well known and is therefore only briefly summarized here. The four-stroke engine is characterized by (1) an intake/induction stroke, (2) a compression stroke, (3) a power stroke, and (4) an exhaust stroke. The cycle begins at top dead center, when the piston is furthest away from the crankshaft and therefore closest to the cylinder head. In the intake/induction stroke, the piston descends drawing a mixture of gas and fuel into the cylinder through the intake valve. The intake valve closes and the compression stroke compresses the fuel mixture.

The power stroke begins when the gas-fuel mixture is ignited, either by a spark plug 1226 or other ignition source in an Otto cycle engine, or by heat and pressure in a Diesel cycle engine. The resulting expansion of burning gases pushes the piston downward for the power stroke. In the exhaust stroke, the exhaust valve opens and the piston returns to top dead center, thereby pushing exhaust gases out of the cylinder.

Several enhancements to the engines described herein may be used to improve performance and longevity of the engines. For example, where the engines are designed for dual fuel consumption, additives may be added to the liquid fuel for removing tar from valve seals. Suitable additives are described in U.S. Pat. No. 5,112,364 to Rath, et al., and International Publication No. WO 85/01956 of Campbell. Additionally or alternatively, commercially available fuel additives from STP of Boca Raton, Fla.; and GUMOUT® products available from SOPUS Products of Houston, Tex.

Regular use of gas intake cleaners may also promote performance and longevity of engines adapted to use powdered fuels. Intake system cleaners are commercially available and include available from 3M of St. Paul, Minn. and MotorVac of Santa Ana, Calif.

In other embodiments, one or more valves may be coupled to the cylinder block or cylinder head to release substances into the cylinder. A water valve may release water into the cylinder, for example, during the power stroke. In some embodiments, water valve may comprise a nozzle and the water may be sprayed or misted. In other embodiments, for example, in two-stroke engines, a lubricant valve may release lubricant into the cylinder as a substitute and/or supplement to the lubricant typically contained in the fuel/oil mixture consumed by two-stroke engines. In some embodiments, the lubricant may be sprayed or misted.

In other embodiments, the nozzle may be adapted to impart a negative electrical charge on the powdered fuel particles as they enter the intake manifold. By also applying a negative charge to the engine components such as the carburetor, intake manifold, cylinder block, etc., fuel particles will be repelled from engine components to reduce engine fouling. The negative charge may be applied by an electrode charged to 30-95 KV with a leakage current of 15-70 microamps.

A colloidal dispersion of graphite in oil may be used for additional engine lubrication. Graphite oils are commercially available, for example, under the KREX® brand by Krex, Inc. of Northbrook, Ill. Graphite dispersions have the additional benefit of absorbing the negative charge from the cylinder block, thereby repelling the particles from the lubricant.

In some embodiments, a fuel controller may regulate the volume of fuel (liquid and/or powdered) released into the intake manifold. The fuel controller may be any hardware, software, or mechanical component as is known to those of skill in the art, such as computers, microprocessors, and RISC microprocessors. Exemplary systems and components are described in a number of texts including Ross Bannatyne, *Electronic Control Systems* (2003), Ali Emadi, ed., *Handbook of Automotive Power Electronics and Motor Drives* (2005), Ronald K. Jurgen, *Automotive Microcontrollers* (1998), and Ronald K. Jurgen, *Automotive Software* (2006).

The fuel controller may be connected to one or more sensors such as engine temperature sensors, engine speed sensors (tachometers), throttle sensors, intake temperature sensors, exhaust temperature sensors, intake gas sensors, and exhaust gas sensors. Sensors are well known in the art and are available from a variety of vendors including Delphi Corporation of Troy, Mich.

The fuel controller may also receive additional input indicating data about the fuel(s) used in the vehicle. For example, data on powdered fuels may include the type of fuel (e.g. hardwood, softwood, grass, metal, coal, plastic) and specification of the fuels (e.g. particle size, ash percentage, volatile mass percentage), Data on liquid fuels may include the type of fuel (e.g. gasoline, diesel fuel, kerosene) and the specification of the fuels (e.g. octane content, additives). The input may be transmitted, for example, by a console in the vehicle or a sensor in the fuel storage or transport system, or it may be preset.

The fuel controller may adjust fuel flow rates based on one or more inputs from the one or more sensors. For example, additional fuel may be needed as the throttle is opened to allow more gas to flow into the intake manifold. On a more advanced level, fuel flow(s) can be controlled to minimize emissions. Emissions may be reduced through maintenance of a stoichiometric combustion reaction in which there is sufficient oxygen for the powdered fuel and any other fuel to oxidize/combust completely.

Additionally, the fuel controller may adjust fuel flow rates to maximize engine performance. For example, powdered fuel may be particularly effect under conditions requiring less that 50% of the maximum engine horsepower produced when operating on 100% liquid fuel. Furthermore, maintenance of exhaust temperature below 500° C. may minimize ash production, thereby reducing valve fouling.

Figure 13A:
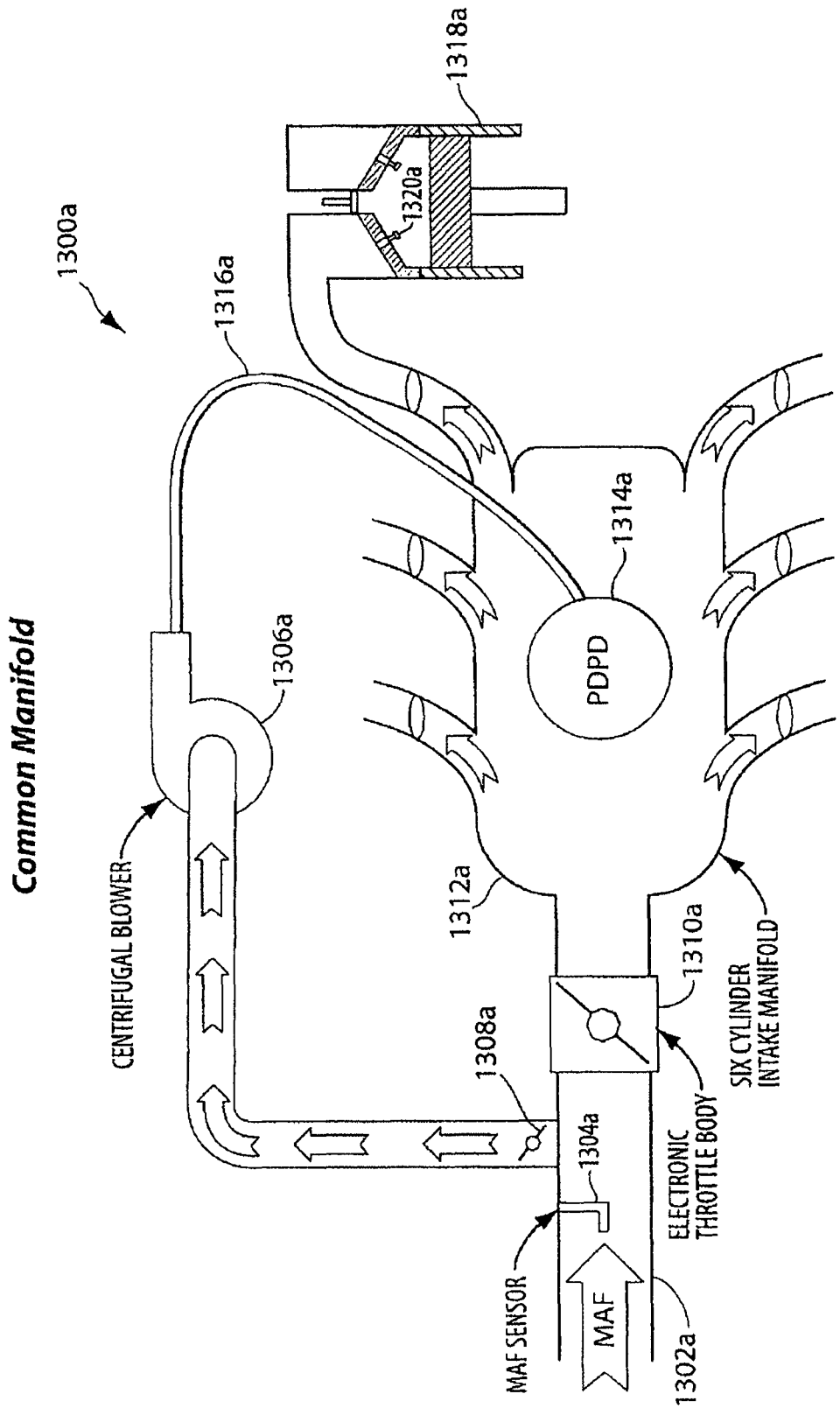

FIG. 13a depicts aspects of an exemplary embodiment of a powdered fuel engine 1300a. A gas, e.g. air enters the engine through intake 1302a. The gas may pass through a filter, such as an automobile air filter as is known in the art before, during, or after entering intake 1302a. The amount of gas passing through intake 1302a is measured by an air sensor such as a mass air flow sensor 1304a. Mass air flow sensors are further described herein. A portion of the gas is diverted from the intake 1302a to a compressor 1306a, for example a centrifugal blower. A throttle plate 1308a regulates the flow of the gas to the compressor 1306a. Another throttle plate 1310a (throttle body) regulates the flow of the remaining gas to the intake manifold 1312a.

The compressor 1306a provides a gas flow to a positive displacement powder dispenser (PDPD) 1314a through a conduit 1316a. PDPD 1314a is coupled with the intake manifold 1312a. In some embodiments, the interior PDPD 1314a operates at intake manifold vacuum pressure. In some embodiments, PDPD 1314a is located completely or partially within intake manifold 1312a. Powdered fuel is dispensed from powder dispenser into the intake manifold 1312a where a fuel/gas dispersion is created. This dispersion is drawn into cylinder 1318a through valve 1320a as described herein.

The engine 1300a as described herein overcomes a major challenge to the use of powdered fuels in variable output combustion devices such as automobile engines. Because a gas flow is used to create and maintain a powdered fuel dispersion, previous attempts at powdered fuel engines have failed to provide satisfactory performance when the throttle 1310a is closed, such as in a cold start. The embodiments provided herein overcome this challenge through the use of "make-up gas" which passes through throttle 1308a to compressor 1306a, through conduit 1316a to PDPD 1314a. The make up allows the creation and maintenance of a powdered fuel dispersion even when throttle 1310a is closed or partially closed.

In some embodiments, "make-up gas" is provided from an auxiliary gas source prior to ignition. In some embodiments, compressor 1306a may be actuated prior to ignition of the engine and throttle plate 1308a partially or completely open to allow for a powdered fuel dispersion to be created prior to cranking of the engine. In other embodiments, a gas such as pure oxygen may be provided from a compressed oxygen tank prior to cranking.

Figure 13B:
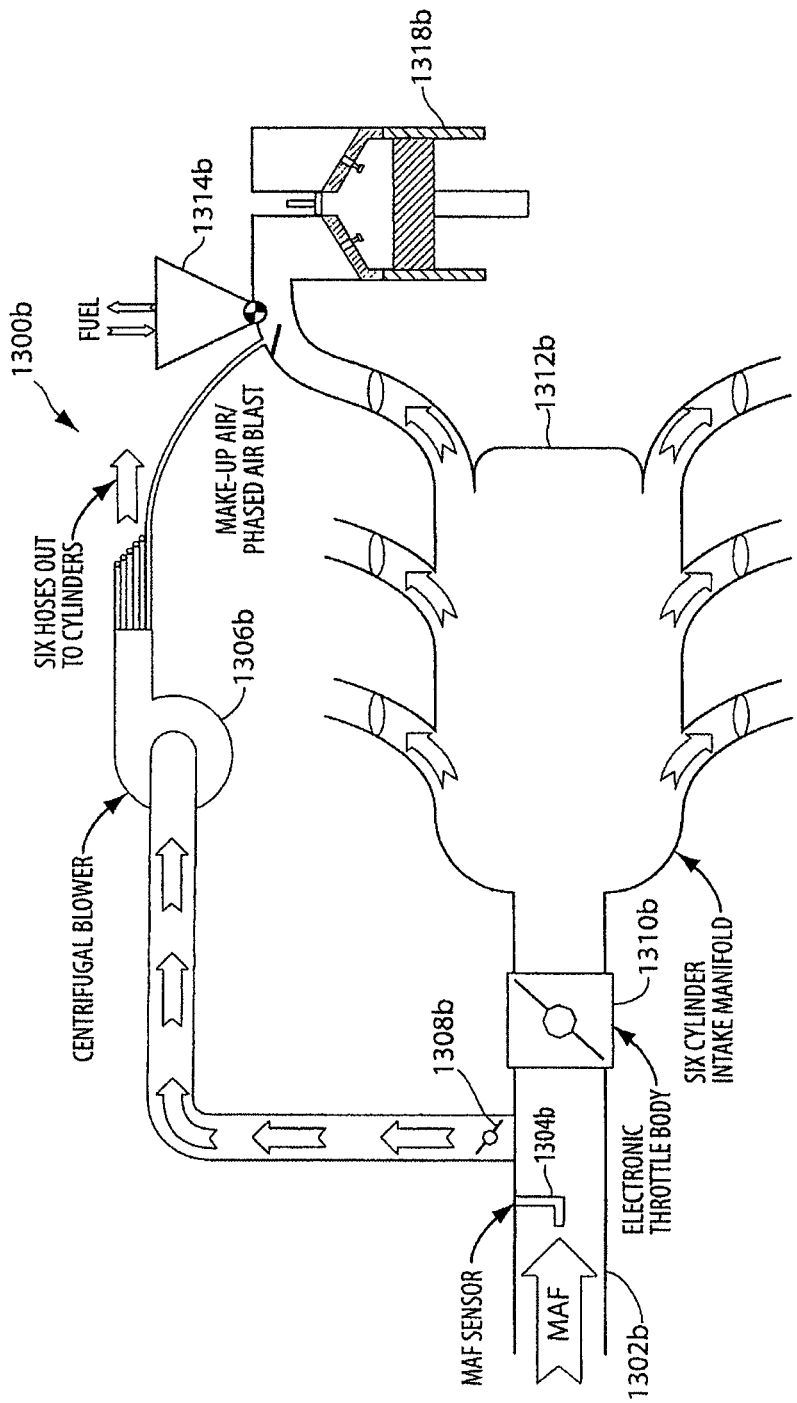

FIG. 13b depicts aspects of another exemplary embodiment of a powdered fuel engine 1300b. Again, a gas, e.g. air enters the engine through intake 1302b. The amount of gas passing through intake 1302b is measured by an air sensor such as a mass air flow sensor 1304b. A portion of the gas is diverted from the intake 1302a to a compressor 1306a, for example a centrifugal blower. A throttle plate 1308a regulates the flow of the gas to the compressor 1306a. Another throttle plate 1310a (throttle body) regulates the flow of the remaining gas to the intake manifold 1312a.

Instead of providing a gas flow to a single PDPD as in FIG. 13a, the compressor 1306b in FIG. 13b provide a gas flow to a conduit 1316b for each cylinder. The conduit 1316b directs the gas flow to a PDPD 1314b (e.g. a hopper system as described herein) for each cylinder. In alternative embodiments, there need not be a PDPD 1316b for each cylinder 1318b. Rather, there may be one PDPD 1314b for a number of cylinders. Exemplary ratios of PDPDs to cylinders include 1:1, 1:2, 1:3, 1:4, 1:5, 1:6; 1:7, 1:8, 1:9, 1:10, 1:11, 1:12; 2:3, 2:5, 2:7, 2:9, 2:11, 3:2, 3:4, 3:2; 3:5, 3:7, 3:8, 3:10, 3:11, 4:3, 4:5, 4:7, 4:9, and 4:11.

PDPD 1314a is coupled with the intake manifold 1312b in proximity to each cylinder. In some embodiments, the interior PDPD 1314b operates at intake manifold vacuum pressure. In some embodiments, PDPD 1314b is located completely or partially within intake manifold 1312b. Powdered fuel is dispensed from powder dispenser into the intake manifold 1312b where a fuel/gas dispersion is created. This dispersion is drawn into cylinder 1318b through valve 1320b as described herein.

Figure 13C:
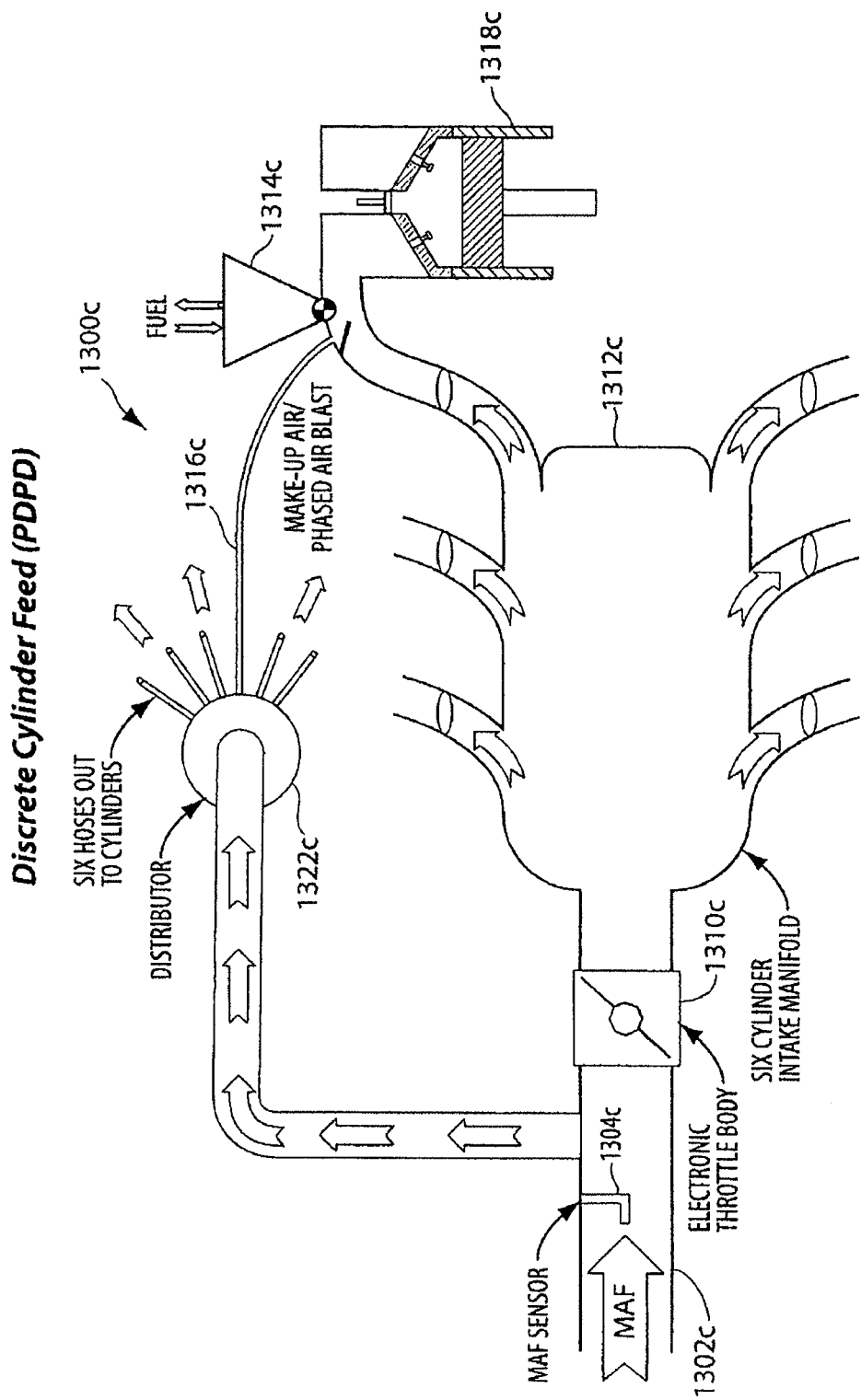

FIG. 13c depicts aspects of another exemplary embodiment of a powdered fuel engine 1300c. Again, a gas, e.g. air enters the engine through intake 1302c. The amount of gas passing through intake 1302c is measured by an air sensor such as a mass air flow sensor 1304c. Unlike system 1300b as shown in FIG. 13b, system 1300c does not utilize a separate throttle plate for the gases which bypass the intake manifold 1312c. Moreover, system 1300c comprises a distributor 1322c instead of a compressor or centrifugal blower. This embodiment recognizes the fact that atmospheric pressure may be sufficient to produce and maintain a powdered fuel dispersion. Moreover, this embodiment is suited for engines comprising a turbocharger which boosts intake gas pressure. The distributor 1322c may simply split the gas flow into a plurality of conduits 1316c. In other embodiments, the distributor may comprise one or more control devices such as solenoids to oscillate the gas flow to individual PDPDs 1314c.

Figure 14A:
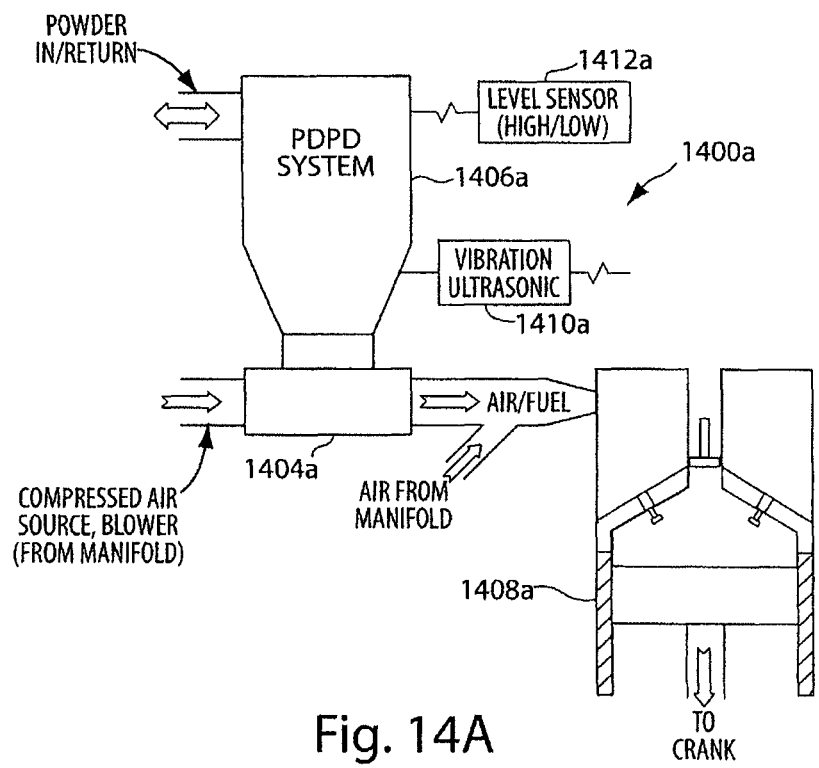
FIGS. 14a and 14b depict additional embodiments of a powdered fuel engine.

FIG. 14a depicts an additional embodiment of the powdered fuel engines described herein. Engine 1400a similar to some embodiments described herein in that includes a compressed gas source 1402a, a turbulence chamber 1404a, ad a powder dispersing device (e.g. a positive displacement powder dispersing device) 1406a coupled with a cylinder. Powder dispersing device 1406a includes additional embodiments to enhance performance. An ultrasound vibrator is coupled with powder dispersing device 1406a to promote powder flow and dispersion. Additionally, a level sensor 1412a is coupled with the powder dispersing device 1406a to monitor the amount of powder in the powder dispersing device 1406a.

Figure 14B:
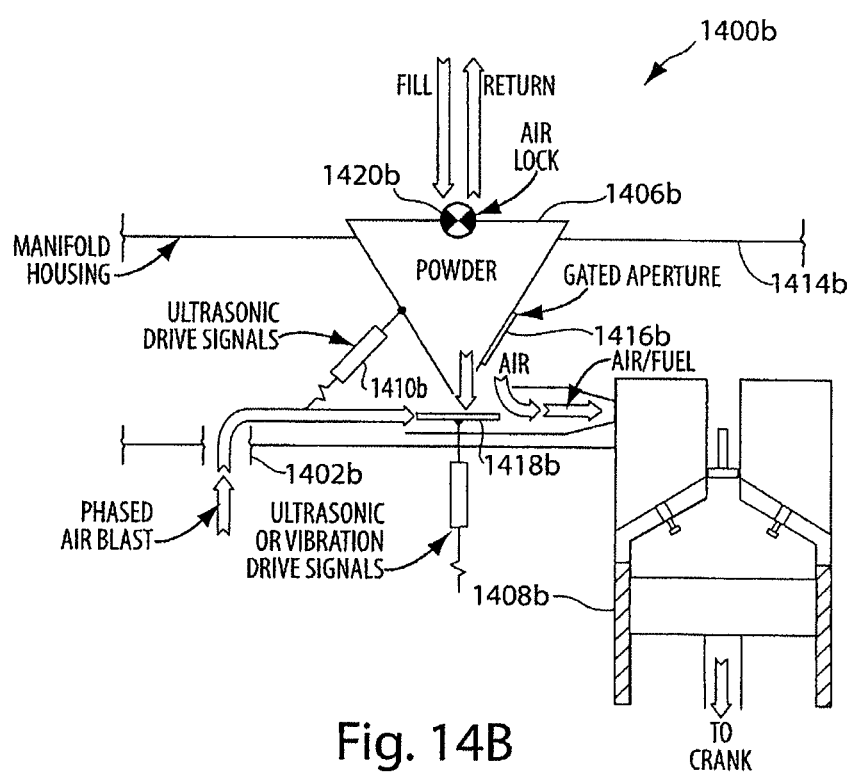

FIG. 14b depicts another embodiment of the powdered fuel engines described herein. Engine 1400b includes a powder dispersing device 1406b which is located at least partially within the intake manifold 1414b. An air lock 1420b maintains a constant gas pressure within the powder dispersing device 1406b while allowing powder to flow from and to a powder storage tank. Powder dispersing device 1406b differs in several respects from other powder dispersing devices described herein. Powder dispersing device 1406b includes a gated aperture 1416 for regulating the flow of powdered fuel. (In other embodiments, the gated aperture may be replaced with a stepping air lock.) Powder flow within the powder dispersing device 1406b is promoted by ultrasonic vibrator 1410b. Compressed gas source 1402b provides a phased air blast to disperse powdered fuel released through gated aperture 1416b. In some embodiments, an ultrasonic vibrator 1418b is positioned below the gated aperture 1416b within the intake manifold 1414b to promote powder dispersion and gas turbulence. Ultrasonic (ultrasound) devices are known in the art and may be fabricated from piezoelectric materials such as lead zirconate titanate (PZT).

Figure 15:
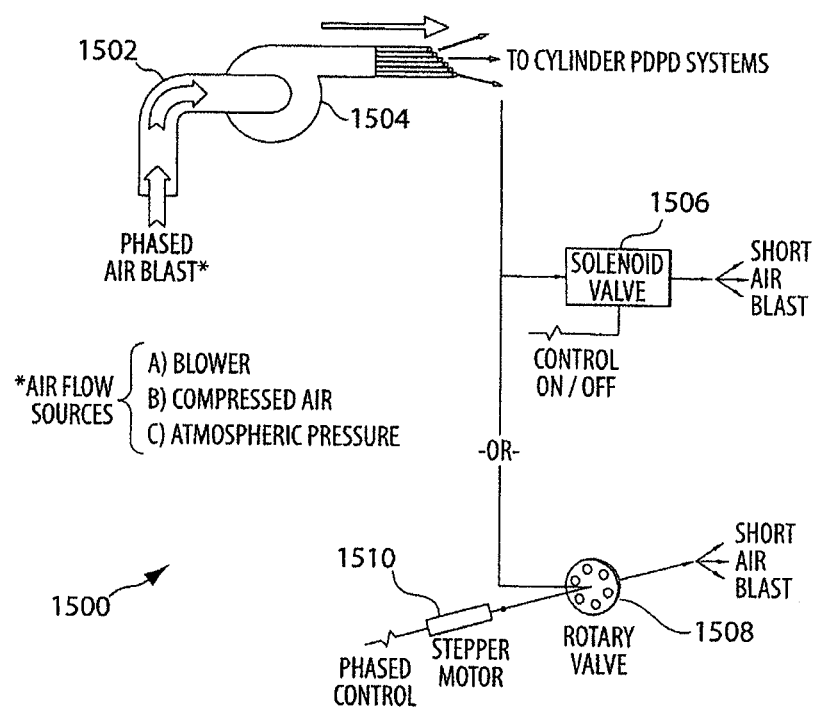
FIG. 15 depicts systems for creating bursts of gas.

FIG. 15 depicts systems 1500 for generating short blasts of gas for dispersing a powdered fuel. A gas enters through intake 1502. In some embodiments, the air flows through a compressor 1504 or a distributor to divide the air flow into an air flow for each powder dispersing device. In some embodiments, a solenoid valve 1506 is opened for brief periods of time to generate a blast of air to disperse a powdered fuel. In other embodiments, a rotary valve 1508 is actuated by a stepper motor 1510 to generate the blast of air.

Figure 16:
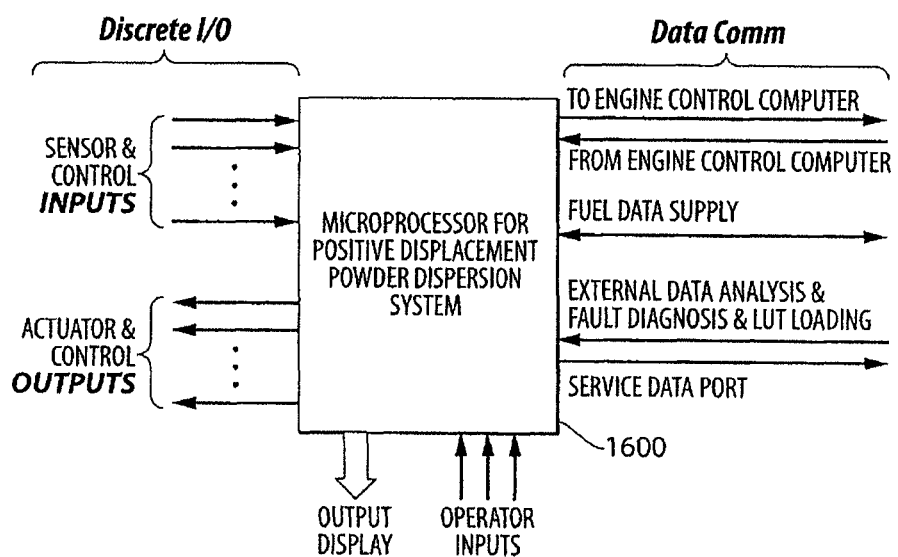
FIG. 16 is a schematic of a microprocessor for controlling a powdered fuel combustion device.

FIG. 16 is a schematic for a microprocessor 1600 for controlling one or more powder dispersing systems. Microprocessor 1600 is an electrical component as is known in the art capable of performing mathematical operations as is well known in the art. Microprocessor 1600 may be any type of microprocessor now known or later developed including 8-bit, 16-bit, 32-bit, 64-bit, multicore microprocessors, and RISC microprocessors. Microprocessor 1600 receives a variety of inputs including inputs from sensors and controls, inputs from operator controls such as user interfaces, inputs from engine control computers, inputs from the fuel supply system and additional devices for external data analysis, fault diagnosis, and look up table (LUT) loading. The microprocessor may provide outputs to variety of devices including actuators for controlling the powder dispersing devices, output displays, engine control computers, fuel data supply monitors, and additional devices for external data analysis, fault diagnosis, and look up table (LUT) loading.

Microprocessor may communicate with other modules and components through communication technologies known to those of skill in the art including hardwire serial or parallel communication, USB, USB-2, Firewire, wireless or other port protocols, smart cards, memory cards, keys, RF transponders, and the Internet.

Figure 17A:
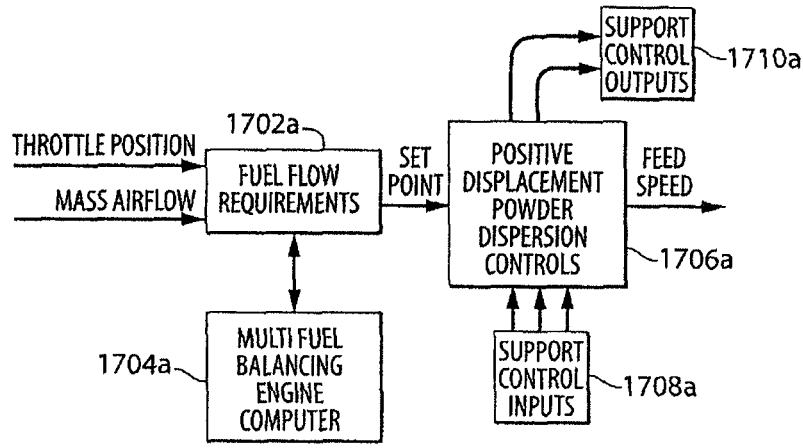
FIGS. 17a and 17b are schematics depicting data flows for controlling a powdered fuel combustion device.
Figure 17B:
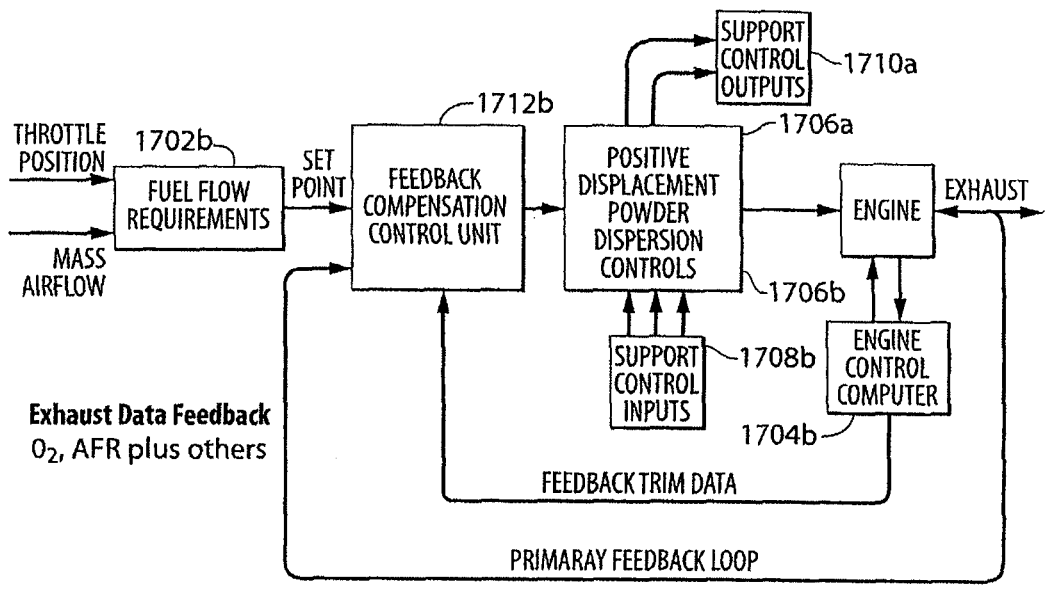

FIG. 17a depicts a schematic for controlling a powder dispersing device. Fuel flow requirements 1702a are determined by the throttle position and the amount of gas flowing by the mass airflow sensor in consultation with inputs from an engine control computer 1704a. In some embodiments, the engine control computer 1704a is configured to optimize engine performance where the engine utilizes a plurality of fuels. Once the fuel flow requirements 1702a are determined, a set point is communicated to the powder dispersing controls, which may receive additional inputs 1708a and generate outputs 1710a for related devices such as compressors, gated apertures, solenoids and the like FIG. 17b depicts a schematic for controlling a powder dispersing device using a closed loop system. As in FIG. 17a, fuel flow requirements 1702b are determined by the throttle position and the amount of gas flowing by the mass airflow sensor in consultation with inputs from an engine control computer 1704b. In some embodiments, the engine control computer 1704b is configured to optimize engine performance where the engine utilizes a plurality of fuels. Once the fuel flow requirements 1702b are determined, a set point is communicated to a feedback compensation control unit 1712b. The feedback compensation control unit may modify the set point in response to feedback from sensors. In some embodiments, the sensors may include exhaust gas oxygen sensors, exhaust gas flow rate sensors, and exhaust gas temperature sensors. In some embodiments, the feedback may be modified or trimmed by the engine control computer 1704b to achieve particular performance objectives.

VII. Additional Embodiments of Powdered Fuel Adapted Devices

The powdered fuels, systems, kits, and methods disclosed herein may be applied to a variety of applications including, but not limited to, hot water heaters, clothes dryers, hot air balloons, grain dryers, space heaters, and ovens by replacing or supplementing existing combustion devices with powder burning devices.

The powdered fuels described herein may be used with a variety of combustion devices including those described in this application. Other suitable combustion devices include burners produced by one or more of the following manufacturers: VärmeTeknisk Service AB of Nyköping, Sweden, Petrokraft AB of Göteborg, Sweden, TPS Termiska Processer AB of Nyköping, Sweden, Coen Company, Inc. of Woodland, Calif., LBE Feuerungstechnick GmbH of Wuppertal, Germany, Thermix Combusion Systems, Inc. of Quebec, Canada, and Alternative Green Energy Systems, Inc. of Quebec, Canada.

VIII. Powdered Fuels

The powdered fuels of the invention have utility in numerous applications for which an alternate, efficient, cost-effective, clean, and renewable energy source is desired. The powdered fuels of the present invention have significant advantage over not only existing alternate energy sources, but also over petroleum, the world's most utilized fuel source. Advantages include, for example, cost efficiency, fuel efficiency, and safety.

In this regard, one embodiment of the invention provides a powdered fuel. The powdered fuel comprises a powder having a certain particle size distribution: less than about 5% of the particles by weight have a size greater or equal to 200 mesh; and at least about 25% of the particles by weight have a size less than 325 mesh. Moreover, the particle size distribution is selected based on the use of the powder as an explosible fuel. In certain embodiments, the particle size distribution is the product of the combination of multiple powders of separate size. Additionally, the powder may comprise a mixture of two or more powder materials.

It is well known that a powder may be explosible if a powder-gas mixture is capable of flame propagation after ignition when mixed with an oxidizer such as air. See, e.g., Marin Hertzberg & Kenneth L. Cashdollar, *Introduction to Dust Explosions*, in ASTM Committee E-27 on Hazard Potential of Chemicals, et al., *Industrial Dust Explosions* 5-13 (1987). However, the present invention provides for the selection of particle size in order to control/harness such explosibility as a fuel source.

Explosibility of the powdered fuel of the invention is controlled, in part, by particle size, with smaller particles generally more explosible than large particles. As such, the powder of the invention is not limited in any way by the material from which the powder is derived. Exemplary embodiments of powdered fuel may include biomass. In some embodiments, the powdered fuel may be stem wood, limb wood, stem bark, or limb bark. Powdered hardwood is available from P.J. Murphy Forest Products Corp. of Montville, N.J. Powdered softwood is available from Custom Grinding of Oklahoma City, Okla.

Some embodiments of powdered fuel contain cellulose and/or lignin. For example, the powdered fuel may comprise greater than approximately 10% cellulose, e.g. 20%, e.g. 30%, e.g. 40%, e.g. 50%, e.g. 60%, e.g. 70%, e.g. 80%, e.g. 90%. Powdered fuels with high lignin content, in certain embodiments, will ignite faster than powdered fuels with low lignin content, but may require more oxygen for combustion. In particular embodiments, the powdered fuel contains a low amount of ash by weight, for example less than approximately 10%, e.g., 9%, e.g., 8%, e.g., 7%, e.g., 6%, e.g., 5%, e.g., 4%, e.g., 3%, e.g., 2%, e.g., 1%, e.g., 0.95%, e.g., 0.90%, e.g., 0.85%, e.g., 0.80%, e.g., 0.75%, e.g., 0.70%, e.g., 0.65%, e.g., 0.6%, e.g., 0.55%, e.g., 0.50%, e.g., 0.45%, e.g., 0.40%, e.g., 0.35%, e.g., 0.30%, e.g., 0.25%, e.g., 0.20%, e.g., 0.15%, e.g., 0.10%, e.g., 0.05%. Additional embodiments contain a low amount of volatile mass after drying. For example, the percentage of volatile mass by weight may be less than approximately 10%, e.g., 9%, e.g., 8%, e.g., 7%, e.g., 6%, e.g., 5%, e.g., 4%, e.g., 3%, e.g., 2%, e.g., 1%, e.g., 0.95%, e.g., 0.90%, e.g., 0.85%, e.g., 0.80%, e.g., 0.75%, e.g., 0.70%, e.g., 0.65%, e.g., 0.6%, e.g., 0.55%, e.g., 0.50%, e.g., 0.45%, e.g., 0.40%, e.g., 0.35%, e.g., 0.30%, e.g., 0.25%, e.g., 0.20%, e.g. 0.15%, e.g., 0.10%, e.g., 0.05%. The percentage of volatile mass may be reduced through drying of the powdered fuel, for varying periods of time. For example, the fuel may be dried for approximately 10, 20, 30, 40, 50, 60, 70, 80, 90, 100, 110, 120, 130, 140, 150, 160, 170, 180, 190, 200, 210, 220, 230, or 240 minutes. Drying temperatures may range from 150° F. to 500° F., for example, approximately 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500° F. Additionally or alternatively, powder drying may be accomplished through the use of ultrasound (ultrasonic) frequencies.

Other embodiments of powdered fuel are comprised of finely ground coal, such as ultra clean coal. Additionally, grindable and/or crushable hydrocarbon-bearing solids such as oil sands, oil shale, and coal tar may be used as powdered fuels.

Any other explosible powder may be used as powdered fuel and with any of the embodiments of inventions described herein. Other exemplary materials include metals, e.g., magnesium, aluminum, iron, titanium, tantalum, and zinc, zirconium, and compounds and alloys thereof, such as magnalium, ferrotitanium, titanium(II) hydride, and zirconium(II) hydride. Other materials include boron, phosphorous, silicon, and sulfur, and compounds thereof such as calcium silicide and stibnite. In addition, many plastics, such at PEET, may be made to be explosible powders when ground.

Moreover, the various types of powdered fuels may have greater consumption efficiency when the fuel conforms to certain particle size distributions. It is within the scope of this invention to select for these particle distributions based on the materials which comprise a particular powdered fuel. In this respect, an exemplary embodiment of powdered fuels comprising powdered softwood particles provides a suitable particle size distribution of a mixture having less than 5% (e.g., 4%, e.g., 3%, e.g., 2%, e.g., 1%, e.g., 0%) particles with a size greater or equal to 50 mesh, less than 15% (e.g., 14%, e.g., 13%, e.g., 12%, e.g., 11%, e.g., 10%) particles with a size greater than or equal to 80 mesh, and at least 20% (e.g., 21%, e.g., 22%, e.g., 23%, e.g., 24%, e.g., 25%) particles have a size less than 200 mesh. It should be understood that these listed percentages are by weight.

In another exemplary embodiment of powdered fuels comprising powdered hardwood particles, a suitable particle size distribution is a mixture having less than 5% (e.g., 4%, e.g., 3%, e.g., 2%, e.g., 1%, e.g., 0%) particles with a size greater or equal to 80 mesh, and at least 30% (e.g. 31%, e.g., 32%, e.g., 33%, e.g., 34%, e.g., 35%) particles with a size less than 200 mesh. It should be understood that these listed percentages are by weight.

In another exemplary embodiment of powdered fuels comprising powdered grass particles, a suitable particle size distribution is a mixture having less than 5% (e.g., 4%, e.g., 3%, e.g. 2%, e.g., 1%, e.g., 0%) particles with a size greater or equal to 200 mesh, at least 65% (e.g., 66%, e.g., 67%, e.g., 68%, e.g., 69%, e.g., 70%) particles with a size less than 325 mesh, and at least 25% (e.g., 26%, e.g., 27%, e.g., 28%, e.g., 29%, e.g., 30%) particles with a size less than 400 mesh. The fuel may also have low ash content, for example less than 1.0% or 0.5% ash. It should be understood that these listed percentages are by weight.

Various embodiments of powdered fuels may include additives to enhance the performance of the fuel. Blended fuels may be created for particular applications such as cold weather driving, high humidity environments, and high energy output requirements. Additionally, additives may be added to the powdered fuel to improve its flowability and reduce any bridging and/or clumping. Suitable additives are described, for example, in U.S. Pat. No. 5,203,906 to Schapira, et al., and U.S. Pat. No. 5,456,775 to Schapira, et al.

It should also be understood that the powdered fuels described herein may produce a variety of energy outputs when combusted, and that such energy outputs of the powdered fuels may be selected for based on the application or use of the fuel. For example, powdered fuels may produce energy outputs in excess of approximately 1000, e.g., 1500, e.g., 2000, e.g., 2500, e.g., 3000, e.g., 3500, e.g., 4000, e.g., 4500, e.g., 5000, e.g., 5500, e.g., 6000, e.g., 6500, e.g., 7000, BTUs per pound of powdered fuel.

Furthermore, the powdered fuels of the invention may, at different times, and for different uses, behave as a solid, a liquid, and a gas. The powder at rest behaves as a solid. Bridging can occur and weight can be supported. When agitated, vibrated, and/or stirred, the powder behaves as a liquid. When suspended in a gas or fluid medium, the powder behaves as a gas. More specifically, when powdered fuel is appropriately mixed with gas, the mixture behaves similarly (structurally, chemically, and economically) to fuel gases such as propane and methane.

A. Powdered Fuel Dispersions

The utility of the powder fuels of the present invention in combustion devices particularly derives not only from the composition of the powdered fuel, but also from the dispersion ratios of the powdered fuel in a carrier gas, i.e., powdered fuel dispersions. As such, one embodiment of the invention provides a powdered fuel dispersion comprising a gas, e.g., air, and a powdered fuel, e.g., cellulose, wherein the powdered fuel is dispersed in the gas at a ratio one part powder to seven parts gas by mass.

The powdered fuel dispersion may be richer in some embodiments, particularly for heating applications. Moreover, the powdered fuel dispersion may be formed at various points throughout a system. For example, in some embodiments, the dispersion may be formed at the nozzle. In other embodiments, for example, engine embodiments, the dispersion released from the nozzle may be diluted by additional air from the intake manifold to achieve a desired ratio for the dispersion.

Suitable powdered fuel dispersions for powdered wood include ratios of 1 gram of powdered wood to cubic foot of air to 110 grams of powdered wood to cubic foot of air. Specific ratios (in terms of grams of powdered wood to cubic feet of air) include e.g. 1, e.g. 2, e.g. 3, e.g. 4, e.g. 4, e.g. 5, e.g. 6, e.g. 7, e.g. 8, e.g. 9, e.g. 10, e.g. 20, e.g. 30, e.g. 40, e.g. 50, e.g. 60, e.g. 70, e.g. 80, e.g. 90, e.g. 100, and e.g. 110.

Another embodiment of the invention provides a powdered fuel dispersion wherein the powdered fuel is a powdered fuel as describe hereinabove.

For example in one embodiment, the powdered fuel dispersion comprises a powdered fuel wherein:
less than about 5% of the particles by weight have a size greater or equal to 200 mesh, e.g., less than about 1% of the particles by weight have size greater or equal to 200 mesh, e.g., all of the particles have sizes less than or equal to 200 mesh; and
at least about 25% of the particles by weight have a size less than 325 mesh, e.g., at least 30% of the particles by weight have a size less than 325 mesh.

In another embodiment, the powdered fuel dispersion comprises a powdered fuel wherein:
less than 5% of the particles by weight have a size greater or equal to 50 mesh;
less than 15% of the particles by weight have a size greater or equal to 80 mesh; and
at least 20% of the particles by weight have a size less than 200 mesh.

In yet another embodiment, the powdered fuel dispersion comprises a powdered fuel wherein:
less than 5% of the particles by weight have a size greater or equal to 80 mesh; and
at least 30% of the particles by weight have a size less than 200 mesh.

In yet an additional embodiment, the powdered fuel dispersion comprises a powdered fuel wherein:
the powdered fuel has a particle size distribution wherein:
less than 5% of the particles by weight have a size greater or equal to 200 mesh;
at least 65% of the particles by weight have a size less than 325 mesh; and
at least 25% of the particles by weight have a size less than 400 mesh.

In certain embodiments, the dispersions described herein produce a two-phase combustion process that is visually indistinguishable from, and effectively, a single-phase combustion process.

Without wishing to be bound by theory, it is suggested that the explosibility of the pre-mixed powder dispersions of the present invention empirically derives from similar theoretical considerations as a pre-mixed liquid fuel/gas mixture, as modified by droplet combustion physics, provided that a particle's combustion time is comparable to the transit time of a deflagrating combustion wave in gas for a combustible gaseous fuel.

Despite the similarities to gases and liquids, powdered fuels possess different properties to be overcome in order to achieve clean, dependable, and efficient combustion. When liquids are burned, combustion occurs at a virtual surface located a certain distance away from the droplet and vapors from the liquid diffuse to this surface. In contrast, combustion of powdered fuels occurs at the surface of the powder particles. Accordingly, the particle size and fuel to gas ratios take on a greater importance in harnessing powdered fuels than in liquid fuel systems.

As such, based on the discoveries discussed herein, one embodiment of the invention relates to the design of devices, kits for adapting devices, and powdered fuels utilizing droplet combustion physics. For example, it is within the scope of the present invention to design and utilize specific components, such as nozzles described herein, e.g., for use in burners for powder burning systems, with greater predictability in response and performance characteristics.

B. Preparation of Powdered Fuels

The powdered fuels of the present invention may be prepared in any manner that provides particulates that fall within the established criteria described herein. Accordingly, in one embodiment powdered fuel of the invention may be fabricated by use of a mill, for example an impact mill, to crush matter into a powder. Meshes or sieves may be used to filter the material to the specifications for powdered fuel. Suitable mills include, for example, the HS 20 mill produced by Bauermeister USA, Inc. of Memphis, Tenn. In some embodiments, the mill operates in a carbon dioxide atmosphere to minimize any risk of explosion incident with the production of powder.

Hammermills consist of sharp edged hammers rotating at high speed on a shaft which drives them past cutting bars set in the perimeter between screens which can pass particles of a given size with the gas stream which is introduced with the feed stream. Further description is provided at Bauermeister USA, Inc., Equipment, http://www.bauermeisterusa.com/Equipment05/Equip_frame.html (last accessed Oct. 19, 2007) and Bliss Industries, Inc., *Eliminator Hammermill* (2007), available at http://www.bliss-industriw.com/pdfs/condmill.pdf (last accessed Oct. 19, 2007). By varying the clearance between the hammers and the cutting bars the feed is cut to particles small enough to pass through the screens while the larger particles continue to circulate around the perimeter.

In another embodiment, attrition grinding produces fibers without causing excessive wear to hammers, knife edges, and screens. Screens tend to clog up with stuck fibers but classification by particle size/density may not separate out fibers. Long thin fibers have on average one half the surface to volume ratio of individual particles of the same diameter as the fiber. This difference may not be significant for heating applications, but may be for automotive applications. As such, in certain embodiments, the powders of the invention comprise fibers, or a mixture of particles and fibers. In certain other embodiments, the powders of the invention do not comprise fibers.

In contrast to the impact milling, the attrition milling process calls for the feed material to be ground between rotating surfaces in which the particles are subjected to attrition rather than cutting with the product separated based on centrifugal air classification rather than screening. This approach is illustrated by the Classifier Mill BM-CLM, available from Bauermeister USA, Inc. of Memphis, Tenn. The KDS MICRONEX™ reduction system, produced by First American Scientific Corp. of Delta, British Columbia, represents an extension of this approach which recognizes that the impact or attrition generates heat which can be used evaporate the water in the undried raw chips.

All of the mills cited above are specified to be able to produce 325 mesh powder. For example, the 200 mesh hardwood powder used in the examples described herein is reported to have been made by hammer mill/screen fractionation. The 80 mesh softwood was produced by hammer milling wood chips through a coarse screen and then passing the result though 80 mesh shaker screen with the larger particles returned for regrinding.

C. Particular Advantages of the Powdered Fuels of the Invention

Powdered fuels, as disclosed herein, enjoy benefits over existing biomass technologies. By providing a controlled and selected fine grade powder, more efficient combustion occurs resulting in less particulate emissions. Moreover, the inventions disclosed herein do not suffer from the particulate emissions and odors associated with other biomass fuels and devices. This is due, in part to the fact that the size of previous biomass resulted in combustion as a diffusion flame, which in turn resulted in the associated soot formation. In contrast, embodiments of the inventions described herein use powdered fuels mixed with a gas to produce, in some instances, a pre-mixed flame or a deflagrating wave front. As a result, embodiments of the inventions consume both hardwood and softwood powders without the characteristic odor of burning wood.

Furthermore, unlike biomass systems that rely on larger biomass, such as wood chips, the powdered fuels in the invention allow for biomass combustion with the on/off and adjustment capabilities normally associated with liquid fuels. Because the powders burn almost instantaneously, the flame may be extinguished without delay. Likewise, because the powders burn almost instantaneously, the energy output from a combustion device may be quickly increased by the addition of additional powder and gas, or decreased by the removal of the powder gas dispersion. These characteristics allow for the use of biomass in systems in which controllable performance is critical, such as automobiles.

Moreover, existing alternative energy systems are only capable of burning particular types of fuels. As a result, wide ranges of materials are currently discarded as refuse instead of harnessed for energy production. The methods and apparatus disclosed herein will achieve environmental benefits by extracting energy from materials that heretofore have been untapped. For example, a number of approaches to biomass fuels overlook what is colloquially referred to a "bioscrap,"—materials whose value is so low at present that it is not worth the cost of harvesting. Examples include grasses, corn stalks, plant solids, and sugar cane. In the example of sugar cane, the inventions disclosed herein would allow for the capture of the 80% of the BTU content in sugar cane that is discarded in sugar production.

Through the use of the inventions described herein, energy may be produced from powdered fuels more cost effectively than is currently possible with liquid fuels such as oil. For example, using the inventions herein, if wood is priced at $50/dry ton, which is the current price, and oil is priced at approximately $100/barrel, which oil is forecasted to reach shortly, the combustion of powdered wood fuel will produce five times as much energy per dollar as the combustion of oil.

The methods and apparatuses disclosed herein also will contribute to energy self-sufficiency. By harnessing the wealth of powdered fuel sources, such as biomass, an individual, or country, can shift from an economy dependent on oil to an economy that utilizes resources that are both renewable and capable of production by the individual, or within the country.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. The contents of all references, issued patents, and published patent applications cited throughout this application are hereby incorporated by reference.

We claim:

1. A method of producing energy comprising the steps of:
    mixing a substantially explosible powder with an oxidizing gas to form an explosible powder dispersion;
    directing the explosible powder dispersion in a controlled stream past an ignition source; and
    igniting the explosible powder dispersion to produce a stationary deflagrating combustion wave;
    thereby substantially consuming the explosible powder to produce energy;
    wherein the explosible powder dispersion comprises:
        less than 5% of the particles by weight having a size greater or equal to 200 mesh; and
        at least 25% of the particles by weight having a size less than 325 mesh.

2. The method of claim 1, wherein the energy is heat energy.

3. The method of claim 1, wherein the explosible powder dispersion in the controlled stream is defined by one or more selected from the group consisting of powder fuel energy content, powder fuel size, powder fuel size distribution, powder fuel constituents, oxidizing gas characteristics, and oxidizing gas temperature.

4. The method of claim 1, wherein the explosible powder comprises a material selected from the group consisting of powdered biomass, powdered hardwood, powdered softwood, powdered grass, powdered metals, powdered plastics, and any combination thereof.

5. The method of claim 1 further comprising converting said energy through the operation of a device selected from the group consisting of furnaces, engines, boilers, grain driers, clothes driers, water heaters, combined furnace/water heaters, space heaters, wood burning stoves, gas fireplaces, gas turbines, and electrical generators.

6. A method of operating a combustion device, comprising:
   mixing a substantially explosible powder with an oxidizing gas to form an explosible powder dispersion;
   directing the explosible powder dispersion in a controlled stream to an ignition source; and
   igniting the explosible powder dispersion to produce a stationary deflagrating combustion wave;
   thereby substantially consuming the explosible powder to produce energy and operate a combustion device using this energy;
   wherein the explosible powder dispersion comprises:
   less than 5% of the particles by weight having a size greater or equal to 200 mesh; and
   at least 25% of the particles by weight having a size less than 325 mesh.

7. A method of operating a combustion device, comprising:
   generating an airflow;
   dispersing a controlled quantity of powdered fuel into the airflow to create an explosible mixture; and
   introducing the explosible mixture to a combustion area for deflagration creating a stationary deflagrating combustion wave, thereby operating a combustion device;
   wherein the explosible powder dispersion comprises:
   less than 5% of the particles by weight having a size greater or equal to 200 mesh; and
   at least 25% of the particles by weight having a size less than 325 mesh.

8. The method according to claim 7 wherein the airflow is in a turbulence chamber.

9. The method according to claim 7, further comprising:
   measuring the airflow; and
   adjusting the controlled quantity of powdered fuel to be dispersed as a function of the airflow.

10. The method of claim 7 further comprising:
    analyzing exhaust gases; and
    adjusting the controlled quantity of powdered fuel to create a stoichiometric explosible mixture.

* * * * *